US012558701B2

(12) United States Patent
Willoughby et al.

(10) Patent No.: US 12,558,701 B2
(45) Date of Patent: Feb. 24, 2026

(54) BACK PRESSURE REGULATOR

(71) Applicant: Graco Minnesota Inc., Minneapolis, MN (US)

(72) Inventors: Jason J. Willoughby, Golden Valley, MN (US); Timothy S. Roman, Minnetonka, MN (US); David C. Polovitz, Medina, MN (US); Willem M. Tieleman, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 495 days.

(21) Appl. No.: 18/018,026

(22) PCT Filed: Jul. 21, 2021

(86) PCT No.: PCT/US2021/042504
§ 371 (c)(1),
(2) Date: Jan. 25, 2023

(87) PCT Pub. No.: WO2022/031438
PCT Pub. Date: Feb. 10, 2022

(65) Prior Publication Data
US 2023/0271211 A1     Aug. 31, 2023

Related U.S. Application Data

(60) Provisional application No. 63/062,585, filed on Aug. 7, 2020.

(51) Int. Cl.
*B05B 12/08* (2006.01)
*G05D 16/00* (2006.01)
*G05D 16/06* (2006.01)

(52) U.S. Cl.
CPC ......... *B05B 12/088* (2013.01); *G05D 16/024* (2019.01); *G05D 16/0655* (2013.01)

(58) Field of Classification Search
CPC .... G05D 16/0655; G05D 16/024; F16K 1/38; F16K 1/385; Y10T 137/7836
(Continued)

(56) References Cited

U.S. PATENT DOCUMENTS 2,051,350 A * 8/1936 Smith ....................... F16K 1/34
251/368
2,329,323 A * 9/1943 Benz ....................... F17C 13/04
137/487
(Continued)

FOREIGN PATENT DOCUMENTS

CN          101262954 A     9/2008
CN          206802435 U     12/2017
(Continued)

OTHER PUBLICATIONS

International Search Report and Written Opinion for PCT Application No. PCT/US2021/042504, Dated Oct. 21, 2021, pp. 10.
(Continued)

*Primary Examiner* — William M McCalister
(74) *Attorney, Agent, or Firm* — Kinney & Lange, P.A.

(57) ABSTRACT

A back pressure regulator ("BPR") includes a pressure housing that at least partially defines a flow chamber that the liquid flows through and the BPR has an adjustable restriction that varies with the flow rate to maintain an upstream liquid pressure. The pressure housing is contoured to distribute the liquid flow to provide radial flow into the adjustable restriction from circumferentially about the adjustable restriction. The pressure housing includes ramped and curved side passages that guide the flow and ridges that divide the flow and prevent internal collisions between the flow. A flow deflector extends into the chamber outlet to prevent the radial flows through the annular restriction from
(Continued)

colliding. The flow deflector redirects the flows to smoothly recombine in the chamber outlet.

19 Claims, 15 Drawing Sheets

(58) Field of Classification Search
USPC .......................................................... 137/510
See application file for complete search history.

(56) References Cited

U.S. PATENT DOCUMENTS

| | | | | |
|---|---|---|---|---|
| 2,362,438 A | * | 11/1944 | Marsh | F16K 41/12 |
| | | | | 251/271 |
| 2,448,429 A | * | 8/1948 | Henry | F16K 1/46 |
| | | | | 137/68.28 |
| 2,692,612 A | * | 10/1954 | Drane | G05D 16/0672 |
| | | | | 137/625.36 |
| 3,180,360 A | | 4/1965 | Francois | |
| 3,405,730 A | * | 10/1968 | Baumann | H03M 1/00 |
| | | | | 251/282 |
| 3,520,321 A | * | 7/1970 | Mojonnier | B67C 3/12 |
| | | | | 141/46 |
| 3,529,622 A | * | 9/1970 | Yen | F16K 31/1266 |
| | | | | 251/282 |
| 3,557,831 A | * | 1/1971 | Katchka | G05D 16/0672 |
| | | | | 137/613 |
| 3,762,430 A | * | 10/1973 | Maercklein | G05D 11/006 |
| | | | | 137/98 |
| 4,003,405 A | | 1/1977 | Hayes et al. | |
| 4,143,673 A | * | 3/1979 | Kitsnik | G05D 16/101 |
| | | | | 137/115.26 |
| 4,346,732 A | | 8/1982 | Moos | |
| 4,474,356 A | | 10/1984 | Baumann | |
| 4,625,695 A | * | 12/1986 | Tuckey | F02M 37/0029 |
| | | | | 92/97 |
| 4,671,490 A | * | 6/1987 | Kolenc | F16K 41/12 |
| | | | | 251/267 |
| 4,776,368 A | | 10/1988 | Drozd | |
| 4,886,086 A | | 12/1989 | Etchells et al. | |
| 4,887,639 A | | 12/1989 | Lewis et al. | |
| 5,107,887 A | | 4/1992 | White et al. | |
| 5,176,176 A | | 1/1993 | Lewis et al. | |

| | | | | |
|---|---|---|---|---|
| 5,186,147 A | * | 2/1993 | Bellis | F02M 37/0029 |
| | | | | 123/457 |
| 5,279,327 A | * | 1/1994 | Alsobrooks | G05D 16/0636 |
| | | | | 251/85 |
| 5,669,596 A | * | 9/1997 | Yoshikawa | F16K 41/12 |
| | | | | 251/335.2 |
| 5,865,423 A | * | 2/1999 | Barber | F16K 41/12 |
| | | | | 251/335.1 |
| 5,881,997 A | * | 3/1999 | Ogawa | F16K 41/12 |
| | | | | 251/335.1 |
| 7,673,650 B2 | | 3/2010 | Jennings | |
| 8,496,024 B2 | | 7/2013 | Jones | |
| 12,093,062 B2 | * | 9/2024 | Tasser | G01M 3/2876 |
| 2003/0075701 A1 | | 4/2003 | Barzuza et al. | |
| 2009/0152486 A1 | * | 6/2009 | Bong | G05D 16/024 |
| | | | | 251/129.01 |
| 2011/0068284 A1 | * | 3/2011 | Jorgensen | F16K 3/26 |
| | | | | 251/46 |
| 2011/0174395 A1 | * | 7/2011 | Clifford | G05D 16/0633 |
| | | | | 137/510 |
| 2014/0061527 A1 | | 3/2014 | Hilsabeck et al. | |
| 2023/0120848 A1 | * | 4/2023 | Hawkins | F16K 3/314 |
| | | | | 251/325 |
| 2023/0271211 A1 | * | 8/2023 | Willoughby | G05D 16/0655 |
| | | | | 239/533.1 |

FOREIGN PATENT DOCUMENTS

| | | |
|---|---|---|
| DE | 102016122661 A1 | 5/2018 |
| EP | 1610044 A2 | 12/2005 |
| JP | S56138571 A | 10/1981 |
| JP | S56141257 U | 10/1981 |
| JP | H05507997 A | 11/1993 |
| JP | 2005114090 A | 4/2005 |
| WO | 9119922 A1 | 12/1991 |

OTHER PUBLICATIONS

International Preliminary Report on Patentability for PCT Application No. PCT/US2021/042504, Dated Feb. 7, 2023, pp. 8.
First Japanese Office Action for Japanese Patent application No. 2023-507950, dated Jul. 16, 2025, 9 pages.
First Office action for Chinese application No. 202180058161.4 dated Jul. 3, 2025, 10 pages.

* cited by examiner

1026

1060

1070

1072

FL

1046

1062

BACK PRESSURE REGULATOR

CROSS-REFERENCE TO RELATED APPLICATION(S)

This application claims priority to U.S. Provisional Application No. 63/062,585 filed Aug. 7, 2020, and entitled "BACK PRESSURE REGULATOR," the disclosure of which is hereby incorporated by reference in its entirety.

BACKGROUND

This disclosure relates to pressure regulation. More particularly, this disclosure relates to back pressure regulators in spray systems.

Spray systems, such as those for applying coatings, paints, finishes, etc. can be configured to spray multiple fluids having different colors and/or other fluid properties. Each of the multiple fluids are circulated within closed loops when that fluid is not being sprayed. A portion of the fluid continues to circulate when that fluid is being sprayed. A back pressure regulator is disposed on a return line between the applicator and the storage tank to maintain pressure at the applicator. The pressure causes the spraying and affects the quality of the spray and finish. The pressure is controlled across a variety of volumetric flow rates as the volume of fluid circulating changes during spraying.

The back pressure regulator is a restriction in the flowline. Restrictions can cause turbulent flow and collisions within the fluid. For example, paints can include metallic flakes and can be circulated between a paint kitchen and a spray booth. Turbulent areas in the circulation pathway can cause collisions between the metallic flakes that can damage the metallic flakes, adversely affect the color of the paint and causing undesired degradation. Prior art back pressure regulators can generate significant pressure and flow changes that shear the paint because the fluid enters the aperture from a location nearest the fluid source (e.g., primarily through the front half of the aperture).

SUMMARY

According to one aspect of the present disclosure, a back pressure regulator includes a pressure housing having an outer wall, an inner wall; a flow chamber at least partially defined by the pressure housing, the flow chamber comprising a chamber inlet through the pressure housing and a chamber outlet through the pressure housing, wherein the flow chamber extends circumferentially about the chamber outlet; and a pressure control member at least partially defining the flow chamber, wherein the pressure control member includes a flow deflector disposed on a regulator axis and configured to extend at least partially into the chamber outlet. The inner wall is sloped between a lower end and an upper end. The pressure control member is movable between a closed state during which the chamber outlet is closed, and an activated state during which an annular restriction between the flow chamber and the chamber outlet is open.

According to an additional or alternative aspect of the present disclosure, a method of regulating an upstream pressure includes dividing an inlet flow of a liquid into a first subflow and a second subflow; flowing the first subflow through a first side passage that is ramped between an upstream end and a downstream end and that is curved about a chamber outlet; flowing the second subflow through a second side passage that is ramped between the upstream end and the downstream end and that is curved about the chamber outlet; redirecting the first subflow and the second subflow at the downstream end and towards the chamber outlet; flowing the liquid through an annular restriction to the chamber outlet; and varying a size of the annular restriction based on a volumetric flow rate of the liquid.

DETAILED DESCRIPTION

This disclosure relates to a back pressure regulator for a spray system. The spray system can be a paint spray system, such as for automobiles, among other options. The spray system includes one or more spray assemblies that each include a back pressure regulator. The spray assembly can circulate liquids, such as paints that contain metallic flakes, between a storage tank and an applicator. The liquid circulates and the back pressure regulator maintains pressure in the line. The back pressure regulator prevents internal collisions within the liquid, preventing undesirable color change and prolonging the useful life of the liquid. The back pressure regulator inhibits pressure spikes and maintains a relatively constant upstream pressure across a variety of flow rates, maintaining a constant spray pressure and providing a consistent spray and finish.

Figure 1:
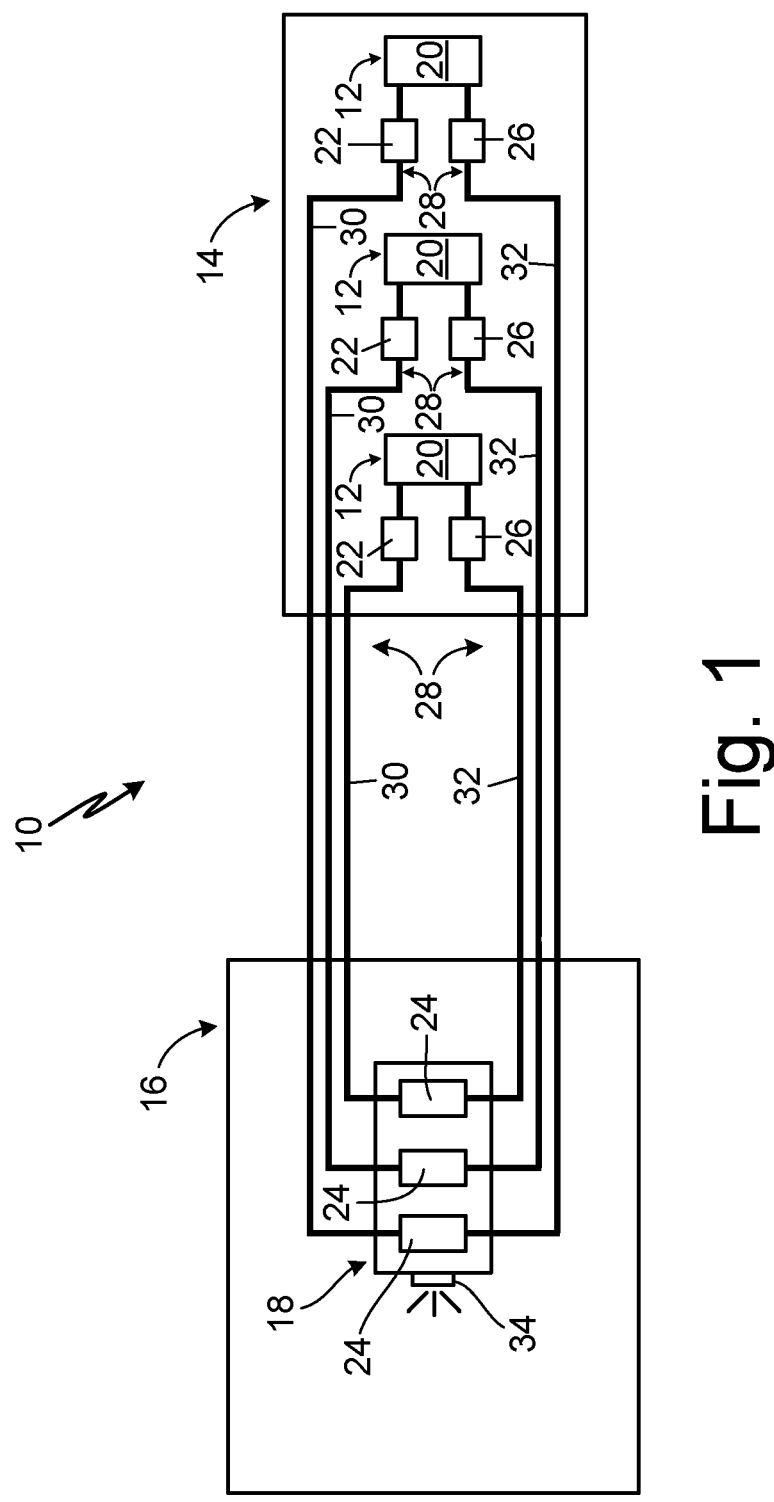
FIG. 1 is a schematic block diagram of a spray system.

FIG. 1 is a schematic block diagram of spray system 10. Spray system 10 includes spray assemblies 12, supply booth 14, spray booth 16, and sprayer 18. Each spray assembly 12 includes reservoir 20, pump 22, spray valve 24, back pressure regulator ("BPR") 26, and pressure loop 28. Each pressure loop 28 is formed by the supply line 30 and return line 32 for that spray assembly 12.

Spray system 10 is a system configured to generate liquid sprays and apply those liquid sprays to a target substrate. For example, spray system 10 can be configured to generate and apply sprays of paints, finishes, and other coatings. While a system for applying paints is utilized herein as an exemplar, such that spray system 10 can be a paint spraying system, it is understood that system 10 can be utilized across a variety of applications. Sprayer 18 receives fluid from the multiple spray assemblies 12 and can selectively connect a spray assembly 12 to the nozzle 34 to apply paint from that spray assembly 12. For example, each spray assembly 12 can be configured to provide a different color paint relative to the other spray assemblies 12. Some of the spray assemblies 12 can provide solvent or other fluids to flush sprayer 18 between applications of the different paints. While spray system 10 is shown as including three spray assemblies 12, it is understood that spray system 10 can include as many or as few spray assemblies 12 as desired.

Each spray assembly 12 provides liquid from supply booth 14 to spray booth 16 via supply line 30 and receives a return flow via return line 32. Pressure loop 28 extends from pump 22 to BPR 26. Reservoir 20 stores a supply of the liquid. Reservoirs 20 are disposed in supply booth 14, which can, in some examples, be referred to as a paint kitchen. Supply booth 14 can be an area of a facility dedicated to storing supplies of paint. Supply booth 14 can be remote from spray booth 16.

Supply line 30 extends between reservoir 20 and sprayer 18. Pump 22 is disposed to pump fluid downstream through supply line 30. Pump 22 can be disposed downstream of reservoir 20 on supply line 30. Pump 22 can be of any desired configuration suitable for driving liquid through supply line 30 and generating spray pressure in pressure loop 28. For example, pump 22 can be a pneumatic, hydraulic, or electric pump, among other options. Pump 22 can be a diaphragm pump, piston pump, plunger pump, or peristaltic pump, among other options. The paint is pumped downstream through supply line 30 to spray valve 24.

Spray valve 24 provides a location for fluid to exit the pressure loop formed by supply line 30 and return line 32. Spray valve 24 is configured to control flow from supply assembly 12 to nozzle 34. With spray valve 24 in an open state, a bypass portion of the liquid flows downstream from spray valve 24 through return line 32 and a spray portion of the liquid flows downstream through spray valve 24 and to nozzle 34. With spray valve 24 in a closed state, the bypass portion is formed by 100% of the liquid pumped downstream by pump 22. The percent of the volumetric flow forming the bypass portion drops when spray valve 24 is actuated to the open state and can vary depending on the degree to which spray valve 24 is open. A rise in the volumetric flow forming the spray portion correlates to a drop in the volumetric flow forming the bypass portion. The pressure at spray valve 24 and in the bypass portion can be the same. The spray portion and the bypass portion can have the same pressure and different flow rates.

Return line 32 extends from spray valve 24 to reservoir 20. BPR 26 is disposed on return line 32 between spray valve 24 and reservoir 20. BPR 26 is configured to maintain the actual liquid pressure in pressure loop 28 upstream of BPR 26 at a desired liquid pressure. Pump 22 builds pressure in the pressure loop 28 and BPR 26 maintains pressure between BPR 26 and pump 22. BPR 26 is disposed downstream of pump 22. BPR 26 is disposed downstream of spray valve 24.

The liquid pressure in pressure loop 28 drives the spray liquid through spray valve 24 and nozzle 34. The pressure thereby causes nozzle 34 to generate the liquid spray when spray valve 24 is in the open state. The pressure in pressure loop 28 affects the quality and pattern of the liquid spray emitted by nozzle 34. Maintaining steady pressure in the pressure loop 28 provides a high-quality, even, consistent spray. The fluid pressure is set and maintained by the BPR 26. The BPR 26 includes a variable opening that adjusts to maintain the actual liquid pressure in pressure loop 28 upstream of BPR 26. For example, a working fluid, such as compressed air or hydraulic fluid, can be provided to BPR 26 to control the variable opening through BPR 26 and maintain the actual liquid pressure. BPR 26 can thereby be pneumatically or hydraulically controlled, among other options. Liquid flowing downstream from BPR 26 returns to reservoir 20.

During operation, each spray assembly 12 provides liquid to sprayer 18 under pressure. For each spray assembly 12, pump 22 draws the liquid from reservoir 20 and pumps the liquid downstream through supply line 30. The working fluid pressure is set at BPR 26 to maintain the actual liquid pressure within pressure loop 28 at the desired spray pressure. Spray valve 24 is initially in a closed state and the liquid flows to return line 32. The full volumetric flow of the liquid forms the bypass portion. The liquid flows downstream through return line 32 and to BPR 26. The force exerted by the spray liquid balances with the force exerted by the working fluid to control the size of the variable restriction through BPR 26 and thereby maintain the actual liquid pressure at the desired liquid pressure. A portion of the liquid flows downstream from BPR 26 and returns to reservoir 20.

Spray valve 24 shifts to the open state to initiate spraying. The spray portion of the liquid flows downstream through spray valve 24 and is emitted as a spray through nozzle 34. The volumetric flow of the bypass portion drops with spray valve 24 in the open state.

Spray valve 24 shifts to the closed state to stop spraying. Spray valve 24 shifting to the closed state increases the volumetric flow of the bypass portion. The opening through BPR 26 varies with variations in the volumetric flow to maintain the actual spray pressure at the desired spray pressure. The size of the opening can increase as the volumetric flow increases and can decrease as the volumetric flow decreases.

Figure 2A:
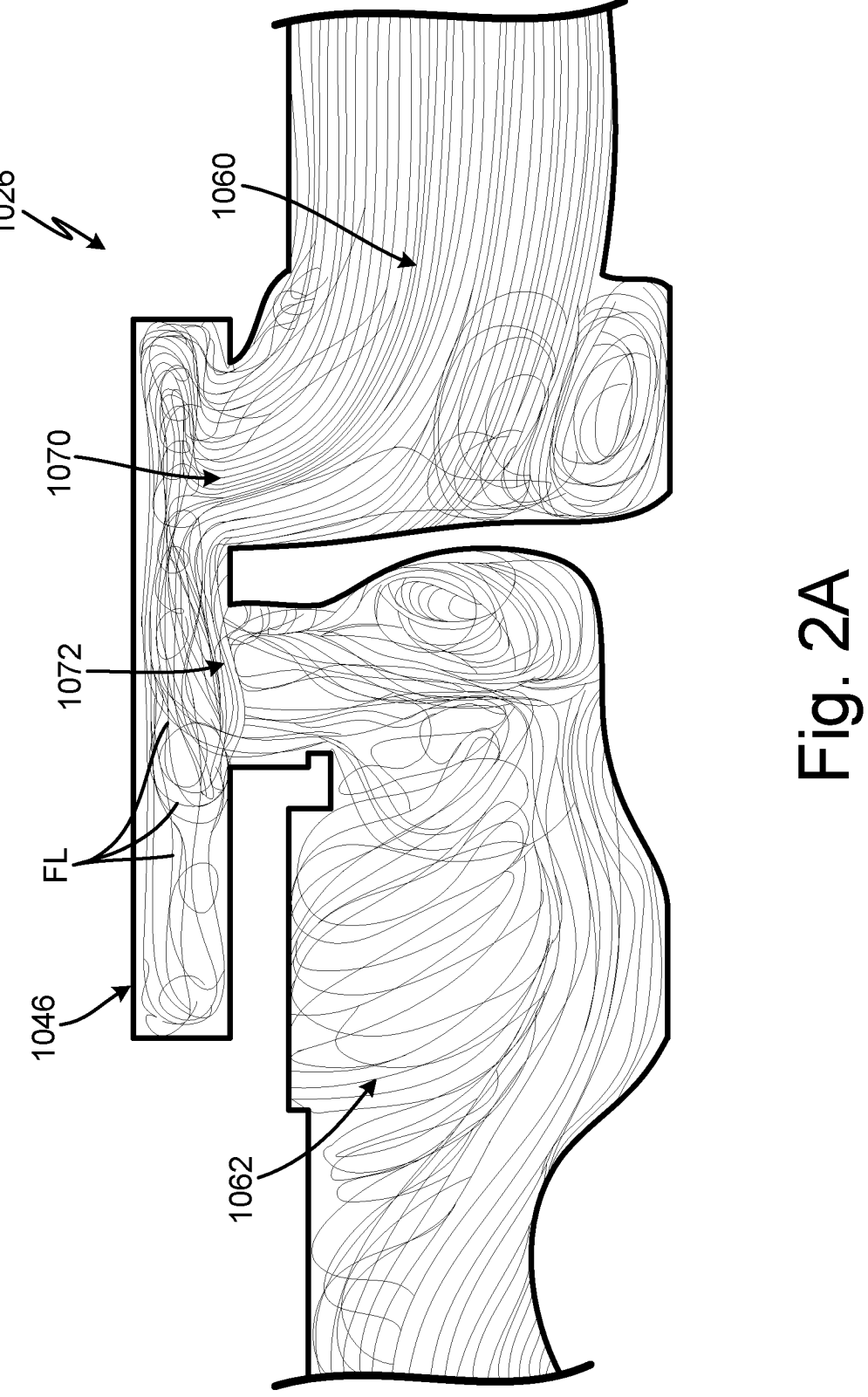
FIG. 2A is a side elevational view showing flow through a prior art back pressure regulator.
Figure 2B:
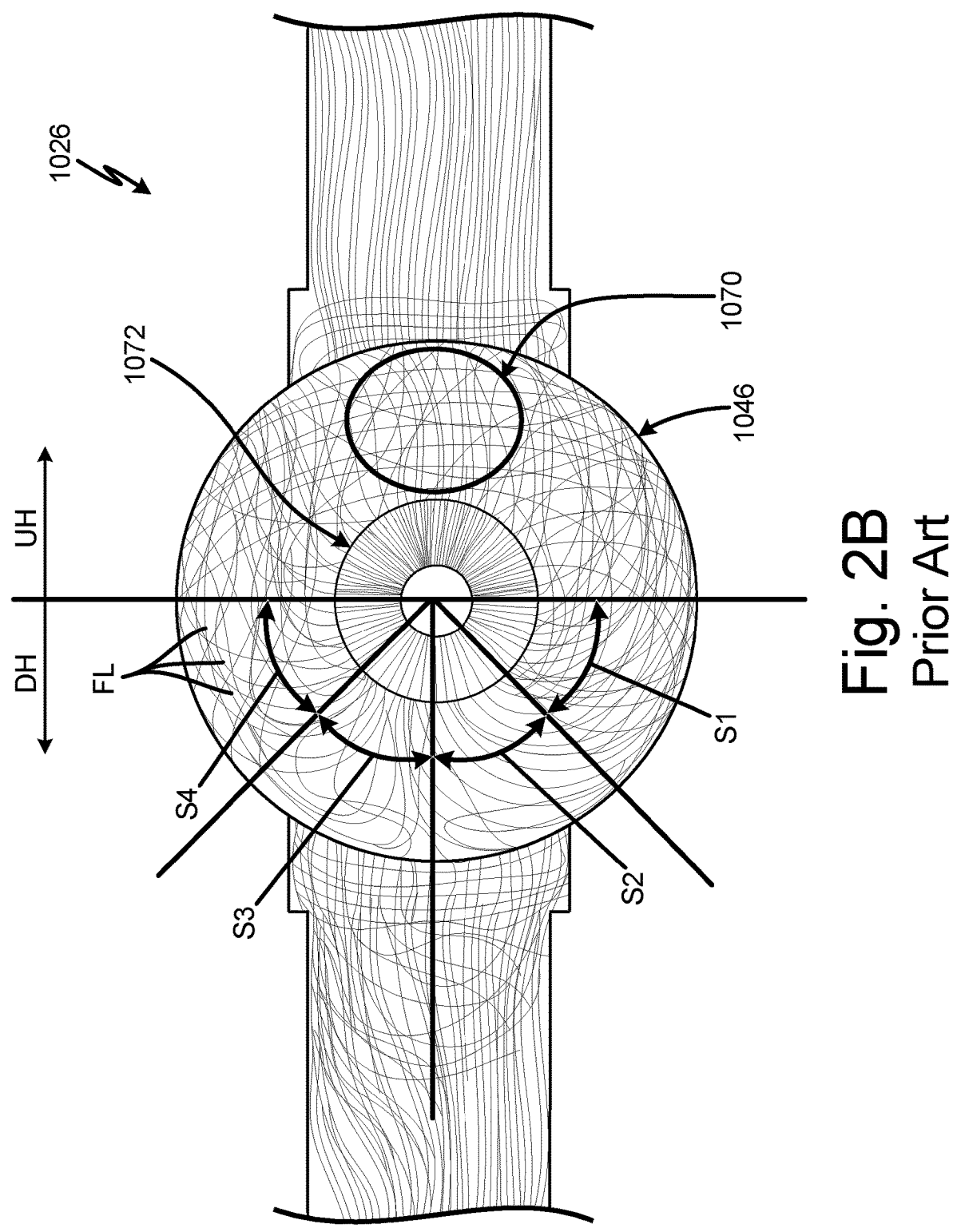
FIG. 2B is a top view of the prior art back pressure regulator shown in FIG. 2A showing the flow lines through the back pressure regulator.

FIG. 2A is a side elevational view showing flow through a prior art BPR 1026. FIG. 2B is a top view showing flow through the flow chamber 1046 of the prior art BPR 1026. BPR 1026 includes flow chamber 1046, regulator inlet 1060, regulator outlet 1062, chamber inlet 1070, and chamber outlet 1072. Flow lines FL show the flow of spray liquid through BPR 1026.

The spray liquid enters BPR 1026 at regulator inlet 1060. The spray liquid flows towards flow chamber 1046 and is redirected form a substantially horizontal flow to a substantially vertical flow by a vertical wall. The spray liquid enters flow chamber 1046 through chamber inlet 1070. As best seen in FIG. 2B, the flow can wrap around chamber outlet 1072. Portions of the flow collide on the back side of flow chamber 1046, which internal collisions can cause degradation of the spray liquid due to internal collisions, such as between metallic flakes in the spray liquid.

Flow chamber 1046 has a substantially uniform height throughout flow chamber 1046. Chamber inlet 1070 is disposed at the leading end of flow chamber 1046 and provides the spray liquid to flow chamber 1046. The spray fluid exits flow chamber 1046 through chamber outlet 1072. Flow chamber 1046 is shown as divided into upstream half UH and downstream half DH. Downstream half DH is divided into first second S1, second sector S2, third sector S3, and fourth sector S4. The contouring of BPR 1026 causes 70% or more of the flow to exit flow chamber 1046 from the upstream half UH of BPR 1026. Less than about 30% of the flow exits flow chamber 1046 through downstream half DH. In some examples, only up to about 10% of the flow flows around chamber outlet 1072 and exits through second sector S2 and third sector S3, such that about 5% of the flow exits through each of second sector S2 and third sector S3. Up to about 15% of the flow exits flow chamber 1046 through the quadrant formed by first sector S1 and second sector S2. Up to about 15% of the flow exits flow chamber 1046 through the quadrant formed by third sector S3 and fourth sector S4. The contouring of BPR 1026 also causes large acceleration as the spray liquid exits flow chamber 1046.

Figure 3A:
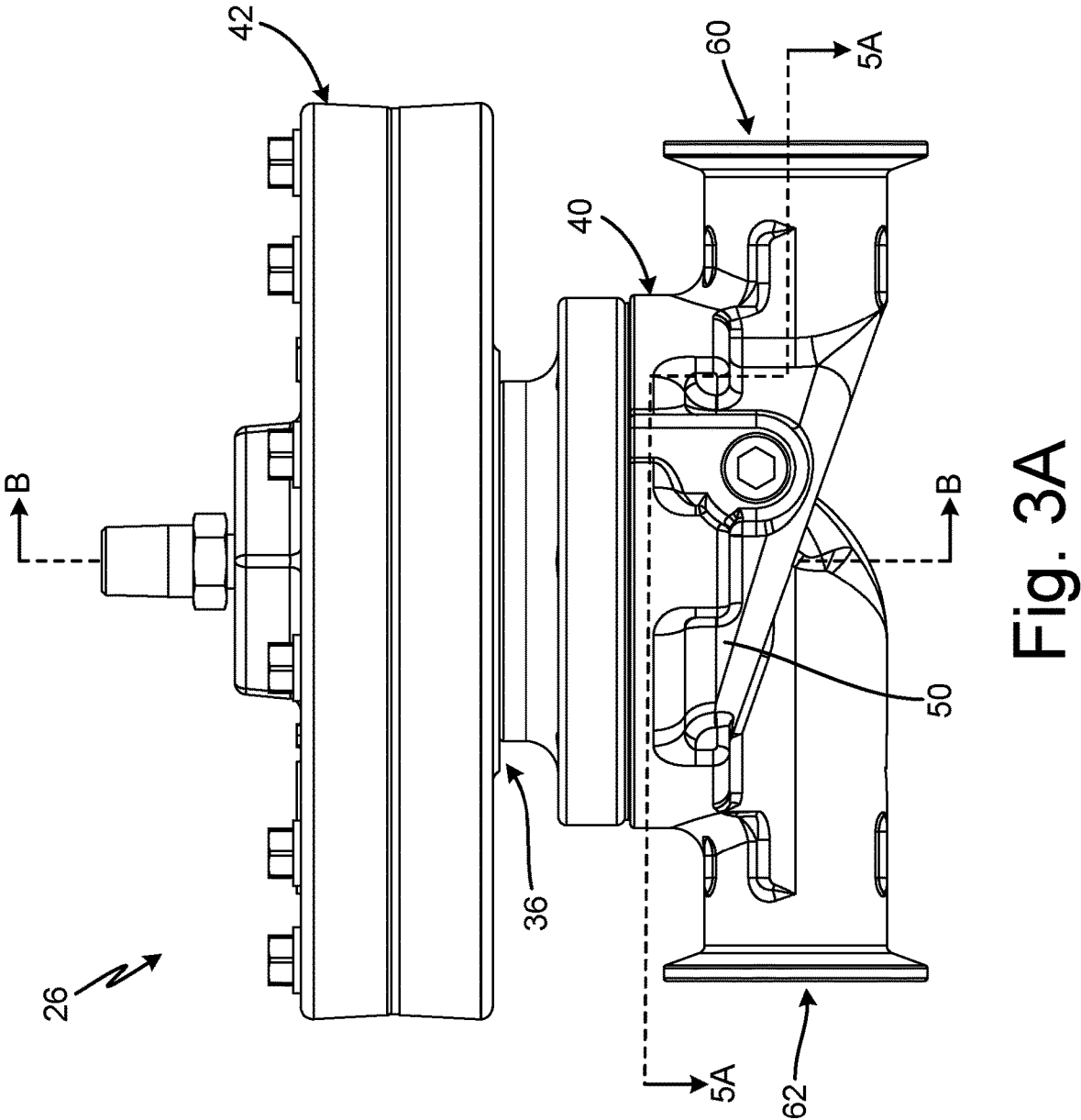
FIG. 3A is an elevation view of a back pressure regulator.
Figure 3B:
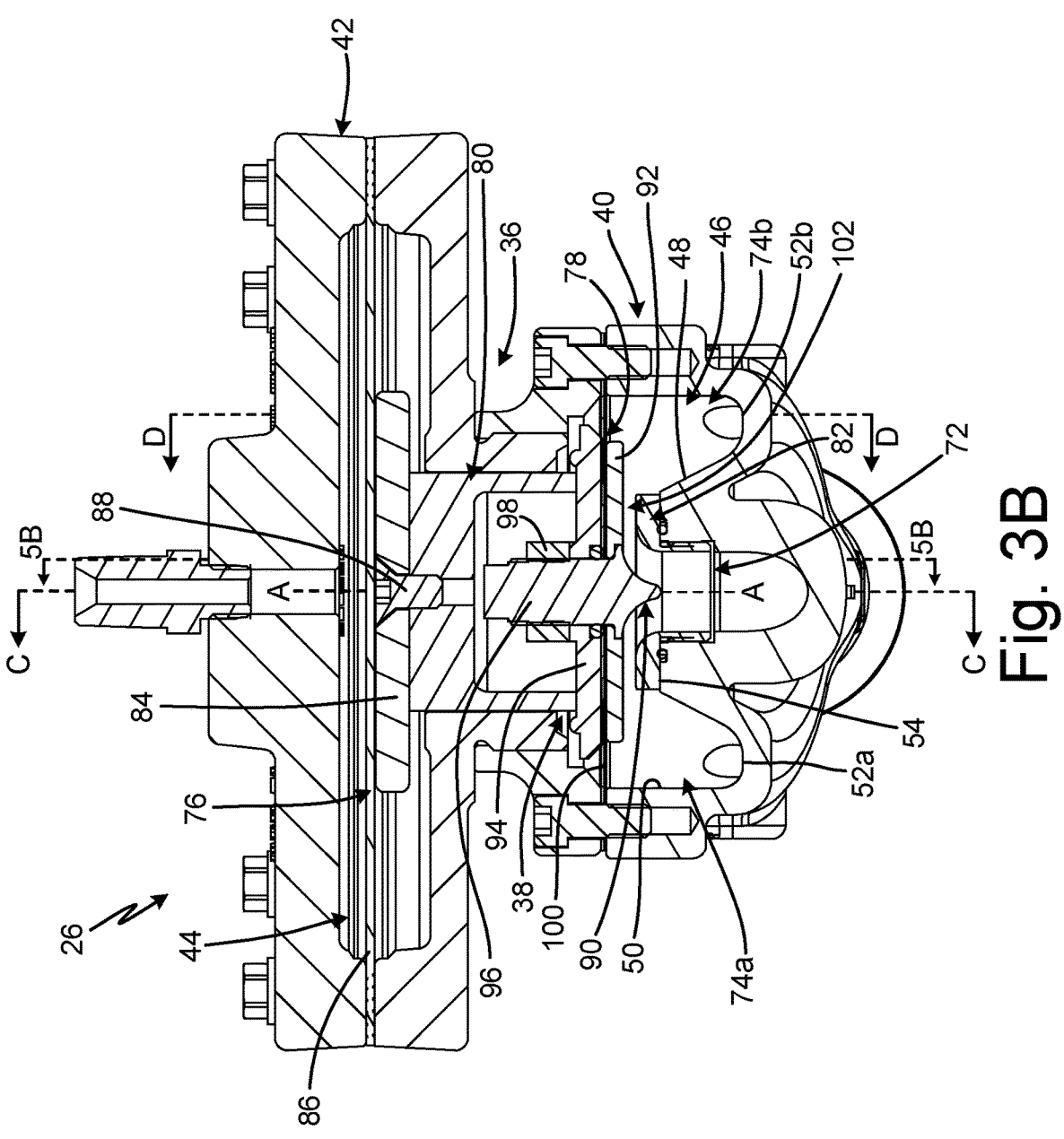
FIG. 3B is a cross-sectional view taken along line B-B in FIG. 3A.
Figure 3C:
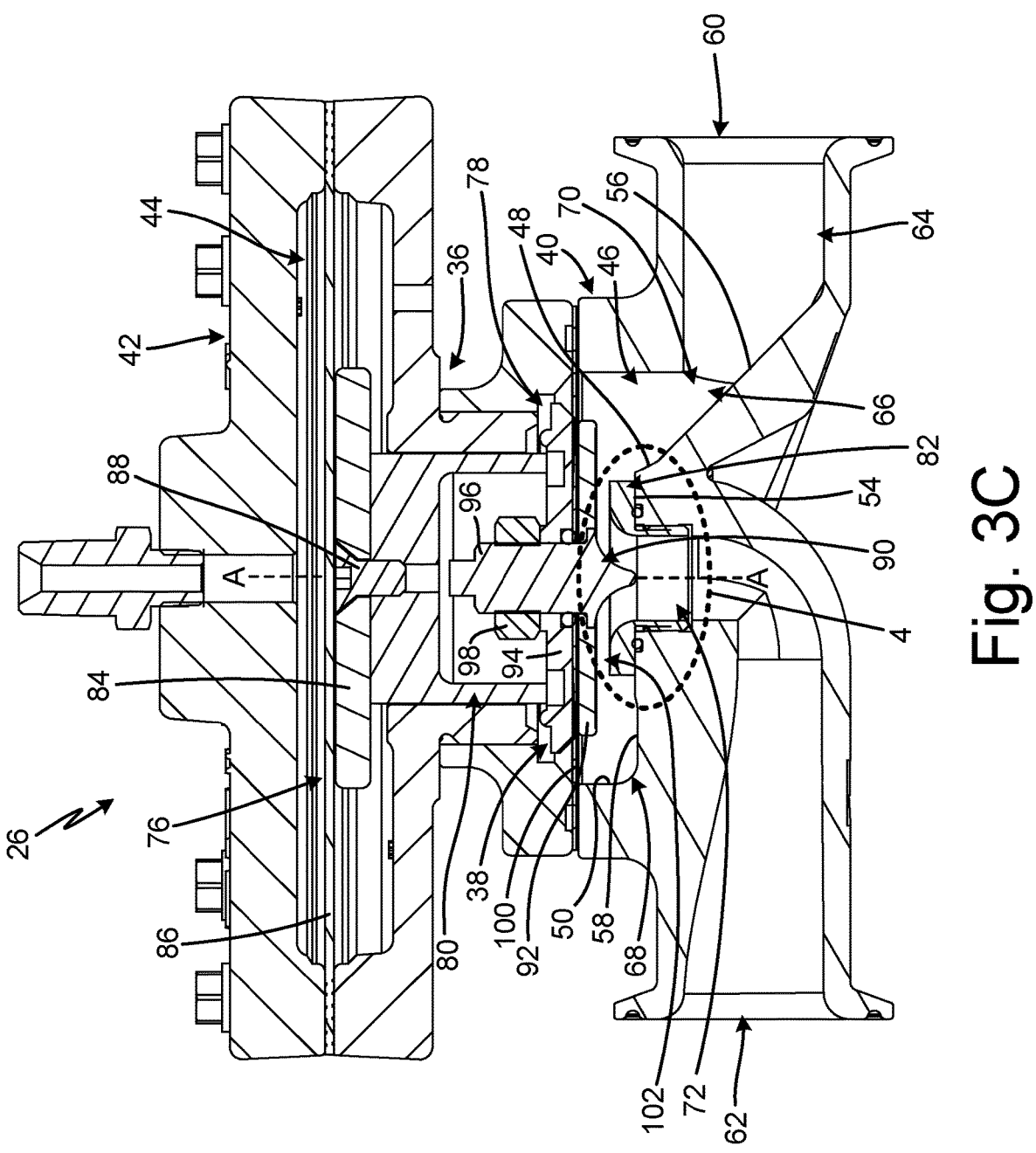
FIG. 3C is a cross-sectional view taken along line C-C in FIG. 3B.
Figure 3D:
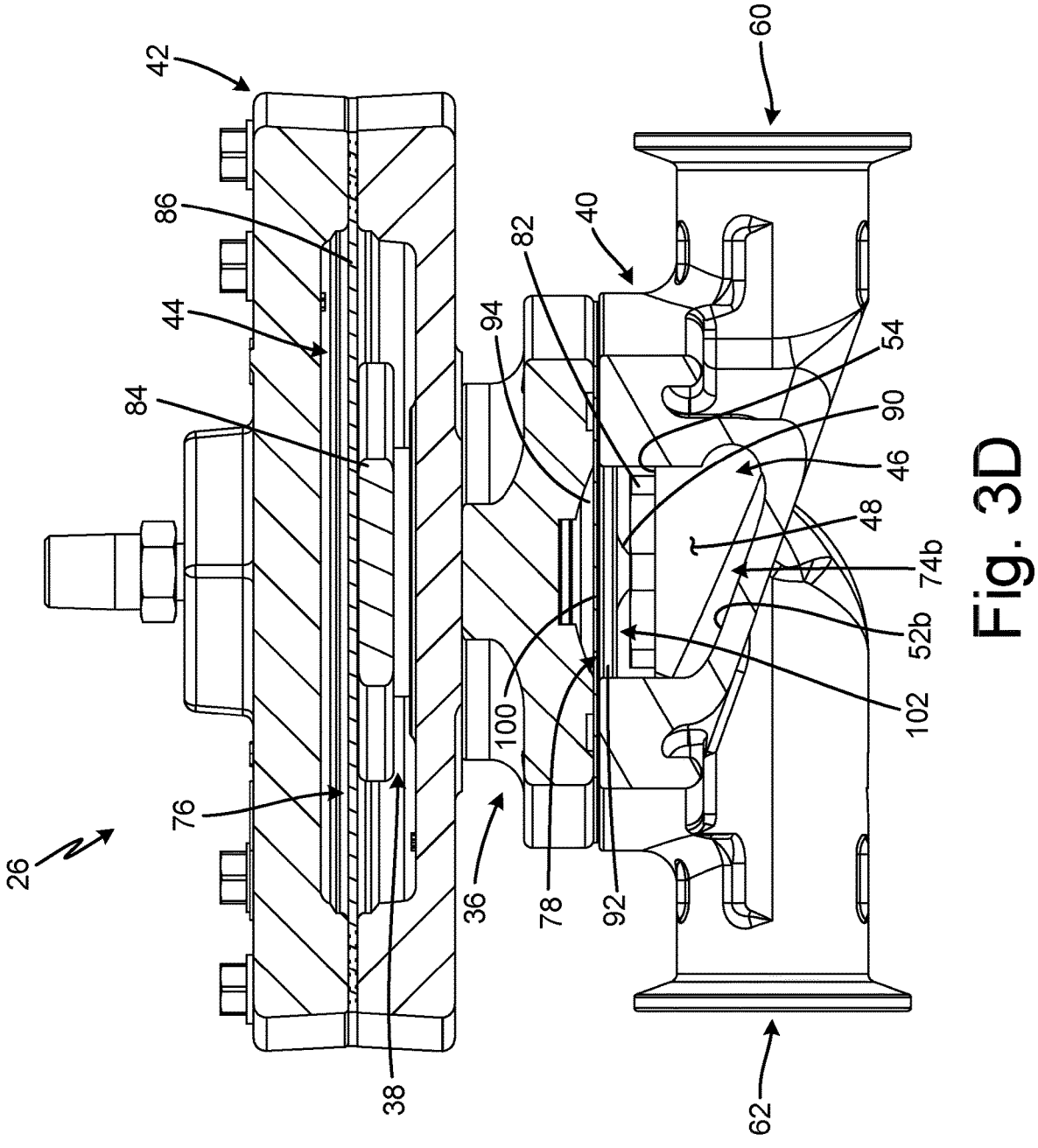
FIG. 3D is a cross-sectional view taken along line D-D in FIG. 3B.

FIG. 3A is a side elevation view of BPR 26. FIG. 3B is a cross-sectional view taken along line B-B in FIG. 3A. FIG. 3C is a cross-sectional view taken along line C-C in FIG. 3B. FIG. 3D is a cross-sectional view taken along line D-D in FIG. 3B. FIGS. 3A-3D will be discussed together. BPR 26 includes body 36 and pressure control mechanism 38. Body 36 includes pressure housing 40 and control housing 42. BPR 26 further includes working fluid chamber 44 and flow chamber 46. Pressure housing 40 includes inner wall 48, outer wall 50, base walls 52a, 52b, regulator shelf 54, upstream ridge 56, downstream ridge 58, regulator inlet 60, regulator outlet 62, and inlet bore 64. Flow chamber 46 includes leading end 66, trailing end 68, chamber inlet 70, chamber outlet 72, and side passages 74a, 74b. Pressure control mechanism 38 includes first member 76, second member 78, regulator shaft 80, and seat 82. First member 76 includes first plate 84, first membrane 86, and first fastener 88. Second member 78 includes flow deflector 90, lower plate 92, upper plate 94, shaft 96, nut 98, and second membrane 100.

BPR 26 is configured to regulate and maintain a pressure upstream of BPR 26. Body 36 supports pressure control mechanism 38. Pressure control mechanism 38 is configured to interface with a working fluid and the spray liquid to maintain the actual liquid pressure within flow chamber 46 and upstream of flow chamber 46 at the desired spray pressure. Pressure control mechanism 38 is configured to shift along regulator axis A-A to vary a size of the annular restriction 102 between second member 78 and seat 82. Control housing 42 is connected to pressure housing 40. For example, control housing 42 can be connected to pressure housing 40 by interfaced threading or fasteners (e.g., bolts), among other options.

First member 76 is disposed within control housing 42 and at least partially defines working fluid chamber 44 within control housing 42. First member 76 is a diaphragm in the example shown, including first membrane 86 and first plate 84. The outer circumferential edge of first membrane 86 is captured between the upper and lower portions of control housing 42. The upper portion and lower portion can be connected in any desired manner, such as by fasteners (e.g., bolts). While first member 76 is shown as a diaphragm, it is understood that first member 76 can be of any form suitable for sealing working fluid chamber 44 and interfacing with second member 78 to bias second member 78 downwards into flow chamber 46. Working fluid chamber 44 is connected to a working fluid source (not shown), such as a hydraulic fluid supply or an air compressor, among other options.

Regulator shaft 80 extends between and transfers force between first member 76 and second member 78. In the example shown, regulator shaft 80 is cylindrical with a closed upper end and an open lower end. Regulator shaft 80 extends between first member 76 and second member 78 to transfer force between first member 76 and second member 78. The body of regulator shaft 80 extends through the interface between control housing 42 and pressure housing 40. Regulator shaft 80 is configured to move relative to control housing 42 and pressure housing 40 with first member 76 and second member 78. In the example shown, first member 76 interfaces with the closed upper end of regulator shaft 80 and second member 78 interfaces with the open lower end of regulator shaft 80. First member 76 can exert a downward force on regulator shaft 80 to bias second member 78 into flow chamber 46. Second member 78 can exert an upward force on regulator shaft 80 to bias first member 76 into working fluid chamber 44. During operation, the forces balance across regulator shaft 80 to control the size of annular restriction 102.

Second member 78 is disposed within pressure housing 40 and at least partially defines flow chamber 46. Second member 78 bounds an upper end of flow chamber 46. Second member 78 is formed as a diaphragm in the example shown. Second membrane 100 is captured between upper plate 94 and lower plate 92. An outer circumferential edge of second membrane 100 is captured between upper portion and lower portion of pressure housing 40. The upper portion and lower portion can be connected in any desired manner, such as by fasteners (e.g., bolts). The upper portion of pressure housing 40 connects to the lower portion of control housing 42. Upper plate 94 interfaces with regulator shaft 80. Lower plate 92 is exposed to flow chamber 46 and disposed opposite seat 82. Shaft 96 extends through each of lower plate 92, second membrane 100 and upper plate 94. Nut 98 is disposed on shaft 96 and secures second member 78 together. A seal is disposed at the interface between upper plate 94 and shaft 96 to prevent undesired liquid migration through second member 78.

Flow deflector 90 extends axially away from second member 78 and towards chamber outlet 72. Flow deflector 90 includes sloped edges extending from a base to a tip. The sloped edges are concave in the example shown. Flow deflector 90 is disposed coaxially with chamber outlet 72. Flow deflector 90 is disposed coaxially with seat 82. In the example shown, flow deflector 90 is disposed coaxially with regulator axis A-A. Flow deflector 90 extends into seat 82 such that a portion of flow deflector 90 is within seat 82 below a top edge of seat 82. Flow deflector 90 extending below the top edge of seat 82 forms a disruptor that inhibits uninterrupted radial flow across seat 82. Instead, liquid flowing into annular restriction 102 on one side of seat 82 encounters flow deflector 90 prior to reaching a center of seat 82. Flow deflector 90 thereby prevents undesired collisions between opposing flows through annular restriction 102, as discussed in more detail below. In the example shown, flow deflector 90 is integrally formed with shaft 96. It is understood, however, that flow deflector 90 can be formed in any desired manner. In some examples, flow deflector 90 can be formed separately and connected to shaft 96, among other options. For example, flow deflector 90 can be connected to shaft 96 by interfaced threading, among other options. In the example shown, the base of flow deflector 90 forms a flange that interfaces with lower plate 92 such that nut 98, shaft 96, and flow deflector 90 clamp lower plate 92, second membrane 100, and upper plate 94 together.

Flow chamber 46 is formed within pressure housing 40 and at least partially bounded by second member 78. Regulator inlet 60 is formed by pressure housing 40 and disposed upstream of flow chamber 46. Inlet bore 64 extends between regulator inlet 60 and chamber inlet 70. Regulator outlet 62 is formed by pressure housing 40 and disposed downstream of flow chamber 46. Liquid enters flow chamber 46 at chamber inlet 70 and exits flow chamber 46 at chamber outlet 72. Chamber inlet 70 is disposed at leading end 66 of flow chamber 46. Leading end 66 is disposed at an upstream end of flow chamber 46. Trailing end 68 is disposed at a downstream end of flow chamber 46. Side passages 74a, 74b extend between leading end 66 and trailing end 68. As discussed in more detail below, each side passage 74a, 74b curves around chamber outlet 72 and reservoir axis A-A.

Side passages 74a, 74b are substantially similar. Side passages 74a, 74b extend between leading end 66 and trailing end 68. In some examples, side passages 74a, 74b can be mirror images of each other disposed on opposite lateral sides of upstream ridge 56 and downstream ridge 58.

For each side passage 74a, 74b, inner wall 48 is disposed on an inner radial side of flow chamber 46. Inner wall 48 is sloped between base walls 52a, 52b and regulator shelf 54. Inner wall 48 is sloped such that a distance between reservoir axis A-A and inner wall 48 is larger at an interface between inner wall 48 and base wall 52a, 52b than a distance between reservoir axis A-A and inner wall 48 at an interface between inner wall 48 and regulator shelf 54. Side passages 74a, 74b are sloped such that the vertical height of inner wall 48 decreases between leading end 66 and trailing end 68.

Base walls 52a, 52b extend between leading end 66 and trailing end 68. Base walls 52a, 52b are sloped between leading end 66 and trailing end 68. A vertical height of flow chamber 46 between a base wall 52a, 52b and second member 78 decreases in the downstream direction between chamber inlet 70 and trailing end 68. An inner radial side of each base wall 52a, 52b interfaces with inner wall 48 and an outer radial side interfaces with outer wall 50.

Outer wall 50 is disposed on an outer radial side of flow chamber 46. Outer wall 50 can extend generally vertically. Outer wall 50 curves about reservoir axis A-A between chamber inlet 70 and trailing end 68.

Upstream ridge 56 is disposed at the upstream end of flow chamber 46 and is formed on inner wall 48. Upstream ridge 56 is a projection that extends away from inner wall 48 and into the flowpath through BPR 26. Upstream ridge 56 can extend from upstream of chamber inlet 70 into flow chamber 46. Downstream ridge 58 is disposed at a trailing end 68 of flow chamber 46. Downstream ridge 58 is a projection that extend vertically relative to base walls 52a, 52b. Upstream ridge 56 imparts an outward velocity component on liquid flowing to flow chamber 46 to guide the liquid into side passages 74a, 74b. Downstream ridge 58 redirects the flow at the downstream end of each side passage 74a, 74b to prevent undesired collisions between particulate within the liquid (e.g., metallic flakes) and direct the flows towards annular restriction 102.

Regulator shelf 54 is disposed opposite second member 78. Regulator shelf 54 can be a plateau formed about chamber outlet 72. Regulator shelf 54 can be an annular surface. Regulator shelf 54 can include an annular groove configured to receive a seal to interface with seat 82.

Seat 82 is connected to pressure housing 40 and disposed opposite second member 78. Chamber outlet 72 extends through seat 82. Seat 82 can be connected to pressure housing 40 in any desired manner, such as by interfaced threading, among other options. Seat 82 is configured to interface with second member 78 with BPR 26 in a closed state. Second member 78 is spaced from seat 82 to define annular restriction 102 and allow flow through BPR 26.

BPR 26 is controlled between a closed state, activated state, and fully open state. In the closed state, second member 78 contacts seat 82 to close annular flowpath 102 and prevent liquid from exiting flow chamber 46. In the fully open state, second member 78 is spaced a maximum distance from seat 82 to fully open annular restriction 102. For example, during flushing of BPR 26 working fluid may not be provided to working fluid chamber 44 such that the pressure in flow chamber 46 causes BPR 26 to shift fully open. In the activated state, the working fluid pressure and the actual liquid pressure balance across pressure control mechanism 38 such that annular restriction 102 is open to a degree between fully closed and fully open. The degree to which annular restriction 102 is open varies depending on the flow rate through BPR 26.

During operation, working fluid is provided to working fluid chamber 44. The working fluid exerts a first force on first member 76 that biases first member 76 downwards towards pressure housing 40. The liquid pressure in flow chamber 46 exerts a second force on second member 78 that biases second member 78 upwards towards control housing 42. The working fluid and spray liquid respectively cause first member 76 and second member 78 exert opposing forces on regulator shaft 80. The opposing forces balance to maintain annular restriction 102 at a desired size to cause the actual liquid pressure to match the desired liquid pressure. The working fluid pressure is set such that the to maintain the actual liquid pressure in flow chamber 46, and thus upstream of BPR 26, at a desired liquid pressure. The size of annular restriction 102 varies with changing flow rates through BPR 26 to maintain the actual liquid pressure at the desired liquid pressure.

Spray liquid enters BPR 26 through regulator inlet 60. The paint flows downstream through inlet bore 64 and encounters upstream ridge 56. Upstream ridge 56 guides the inlet flow into side passages 74a, 74b. The liquid enters flow chamber 46 though chamber inlet 70 and flows through each of side passages 74a, 74b. The liquid flow wraps around chamber outlet 72 and seat 82. Inner wall 48 is sloped towards seat 82 and chamber outlet 72 such that the liquid is guided towards chamber outlet 72 as the paint flows circumferentially about chamber outlet 72. The curvature of outer wall 50 and base wall 52a, 52b facilitates equal flow about chamber outlet 72. The smoothly contoured inner wall 48, base wall 52a, 52b, and outer wall 50 facilitates laminar flow within flow chamber 46. The portion of the liquid that flows through side passages 74a, 74b to trailing end 68 encounters downstream ridge 58. Downstream ridge 58 prevents the two flows from colliding at trailing end 68 of flow chamber 46. Downstream ridge 58 thereby prevents undesired collisions between the flows at the downstream ends of side passages 74a, 74b.

The liquid flow wraps circumferentially about seat 82 and flows to and through annular restriction 102. The liquid enters annular restriction 102 from circumferentially about seat 82. The flow of the liquid entering annular restriction 102 is evenly distributed circumferentially about annular restriction 102. As such, the liquid is evenly distributed as the liquid flows through annular restriction 102 and to chamber outlet 72. Side passages 74a, 74b reduce in height between leading end 66 and trailing end 68 to maintain equal radial flow to annular restriction 102 as liquid exits flow chamber 46 from about annular restriction 102. The contouring of pressure housing 40 facilitates equal radial flow through annular restriction 102.

Flow deflector 90 extends into the opening through seat 82 such that a distal end of flow deflector 90 is disposed below the upper surface of seat 82 that partially defines annular restriction 102. Flow deflector 90 redirects the radial flows of liquid through annular restriction 102 to substantially axial flow through chamber outlet 72. Flow deflector 90 inhibits turbulence and prevents internal collisions between the radial flows. Annular restriction 102 between flow deflector 90 and seat 82 gradually widens to maintain velocity of the flow through annular restriction 102 by preventing sudden deceleration that can cause turbulence and collisions within the liquid.

The paint exits flow chamber 46 annular restriction 102 and chamber outlet 72 and exits BPR 26 through regulator outlet 62. The paint flows downstream from BPR 26 and can continue to circulate the system. The force exerted on second member 78 by the paint varies as the flow rate through BPR 26 varies. The forces exerted by the working fluid and spray liquid are balanced across pressure control mechanism 38 such that the flow area through annular restriction 102 varies with variations in the actual liquid pressure. The variations maintain the actual liquid pressure at the desired liquid pressure across a variety of volumetric flow rates.

BPR 26 provides significant advantages. The geometry and contouring of pressure housing 40 provides smooth liquid flow within flow chamber 46. The geometry and contouring evenly distributes flow circumferentially about chamber outlet 72 and reduces shearing of the spray liquid. The evenly distributed flow provides greater control of the actual liquid pressure and quicker reaction to variations in flow rate. BPR 26 thereby maintains the actual liquid pressure at the desired liquid pressure across a variety of flow rates. The smoothly changing contouring of pressure housing 40 also facilitates flushing of flow chamber 46 and prevents shearing of the spray liquid. The contouring eliminates dead spaces within flow chamber 46 where particulate and solids can accumulate, which can be harmful to the components and operation of BPR 26. BPR 26 prevents accumulation of potentially harmful solids and can be flushed more quickly, reducing the amount of solvent needed to flush paint from BPR 26 during changeover of paint color or changing of BPR 26. BPR 26 also prevents undesired collisions within the paint. Such collisions can harm the paints, such as by damaging metallic flakes (e.g., bent, broken, deformed, etc.), which damage can change the color of the paint. Downstream ridge 58 prevents collisions at trailing end 68 as paint exits each of side passages 74a, 74b and flow deflector 90 prevents collisions as paint flows into chamber outlet 72. Preventing collisions inhibits degradation, thereby maintaining the desired characteristics of the paint. The paint can thereby be circulated for a longer period without experiencing undesired degradation. Increasing the circulation life of the paint decreases costs and downtime of the system.

Figure 4:
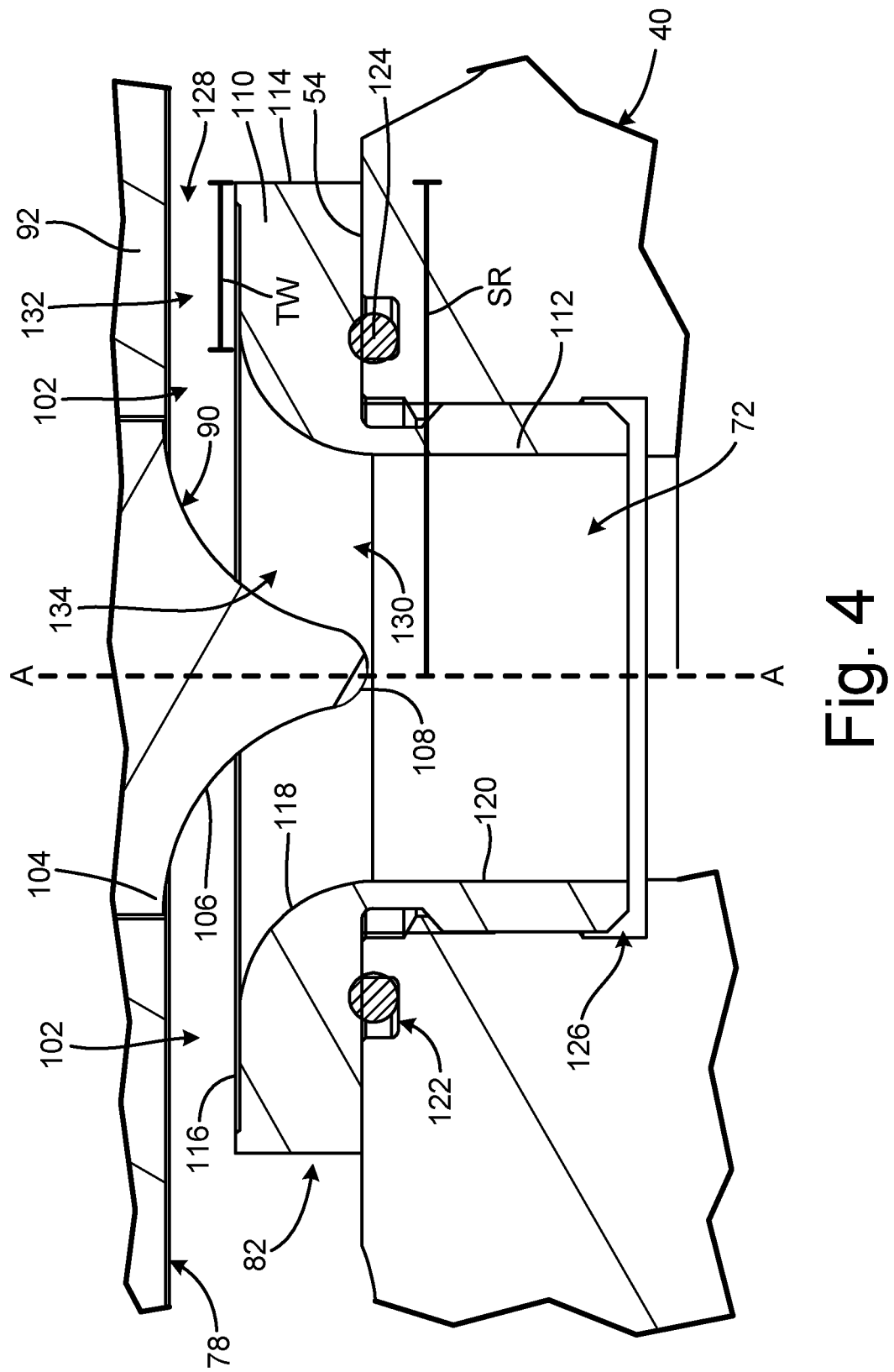
FIG. 4 is an enlarged view of detail 4 in FIG. 3C.

FIG. 4 is an enlarged view of detail 4 in FIG. 3C. Pressure housing 40, second member 78, seat 82, and annular restriction 102 are shown. Regulator shelf 54 and chamber outlet 72 of pressure housing 40 are shown. Flow deflector 90 and lower plate 92 of second member 78 are shown. Flow deflector 90 includes base end 104, deflector side 106, and distal end 108. Seat 82 includes top portion 110, lower portion 112, outer edge 114, top surface 116, transition surface 118, and inner surface 120. Annular restriction 102 includes restriction inlet 128, restriction outlet 130, upstream portion 132, and downstream portion 134.

Seat 82 is mounted to pressure housing 40. Top portion 110 extends radially outward relative to lower portion 112. Lower portion 112 extends generally axially relative regulator axis A-A. Lower portion 112 of seat 82 extends into outlet bore 126 formed in pressure housing 40. Lower portion 112 interfaces with pressure housing 40 to secure seat 82 to pressure housing 40. For example, lower portion 112 and outlet bore 126 can include interfaced threading to fix lower portion 112 to pressure housing 40. It is understood, however, that seat 82 can be connected to pressure housing 40 in any desired manner, such as by a press fit connection, adhesive, etc. Chamber outlet 72 is at least partially defined by seat 82. Seal groove 122 extends into regulator shelf 54 of pressure housing 40. Seal 124 is disposed in seal groove 122. Seal 124 prevents spray liquid in flow chamber 46 from leaking from flow chamber 46 to outlet bore 126 between seat 82 and pressure housing 40. The liquid in flow chamber 46 can exit flow chamber 46 only through annular restriction 102. While seal groove 122 is shown as formed in pressure housing 40, it is understood that, in some examples, seal groove 122 is formed in seat 82.

Figure 5A:
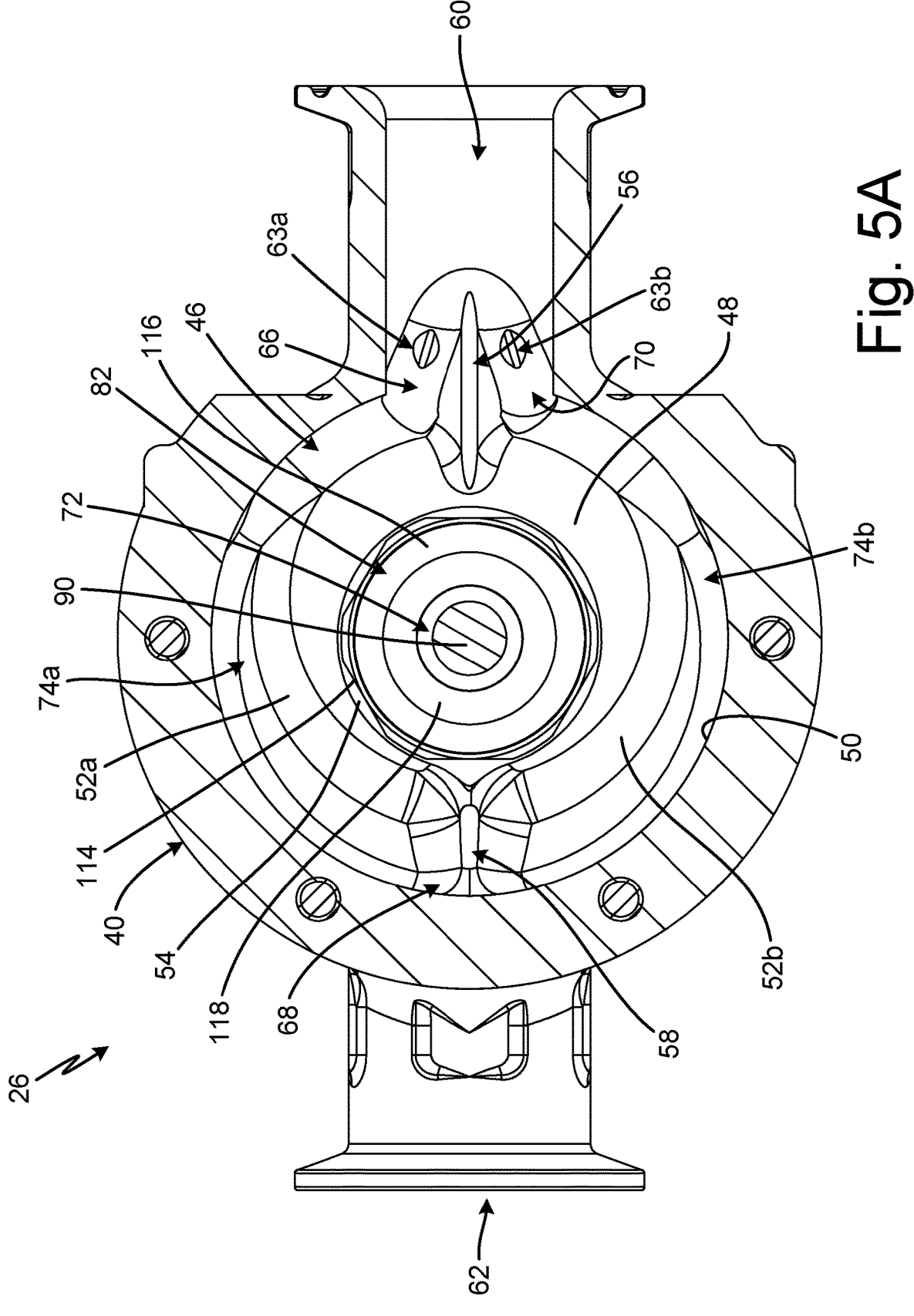
FIG. 5A is a cross-sectional view taken along line 5A-5A in FIG. 3A.

Outer edge 114 forms a radially outermost part of seat 82. Outer edge 114 is disposed about top portion 110. In the example shown, outer edge 114 extends generally vertically. As best seen in FIG. 5A, outer edge 114 can include a contour circumferentially about seat 82. In some examples, outer edge 114 can be a smooth surface circumferentially about seat 82. In some examples, at least a portion of outer edge 114 can be spaced from the edge of regulator shelf 54, where regulator shelf 54 interfaces with inner wall 48.

Top surface 116 at least partially defines annular restriction 102. Top surface 116 is disposed across from lower plate 92 such that a gap between top surface 116 and lower plate 92 forms at least a portion of annular restriction 102. Top surface 116 has width TW. In some examples, width TW can be between about 12.07 millimeters (mm) (about 0.475 inches (in.)) and about 18.29 mm (about 0.72 in.). Seat 82 has a radius SR. The seat radius SR can be between about 18.29 (mm) (about 0.73 in.) and about 25.4 mm (about 1 in.). In some examples, the ratio of width TW to radius SR can be between about 0.5:1 and about 1.25:1. More specifically, the ratio of width TW to radius SR can be between about 0.65:1 and 0.75:1. The width to radius ratio of seat 82 facilitates a steady radial velocity of the liquid flow through annular restriction 102. The width to radius ratio of seat 82 prevents sudden changes in velocity that can generate turbulence and cause degradation of the spray liquid.

Inner surface 120 is formed on lower portion 112 and extends substantially vertically. Transition surface 118 extends between and connects top surface 116 and inner surface 120. Transition surface 118 is a curved surface that provides a smooth transition between top surface 116 and inner surface 120. Transition surface 118 is convexly curved to provide the smooth transition. Transition surface 118 is disposed opposite deflector side 106. Portions of transition surface 118 can be spaced from portions of deflector side 106 both when BPR 26 is in the active state and when BPR 26 is in the closed state.

Second member 78 is configured to shift relative to seat 82 to vary the size of annular restriction 102. Lower plate 92 is disposed opposite top surface 116. Lower plate 92 at least partially defines annular restriction 102. Flow deflector 90 projects from second member 78 into seat 82. Flow deflector 90 extends projects from lower plate 92 and into chamber outlet 72. Flow deflector 90 extends through the opening defined by top surface 116 and into seat 72. Flow deflector 90 is disposed on regulator axis A-A. Flow deflector 90 is disposed coaxially with seat 82. In some examples, flow deflector 90 can be conical. In some examples, flow deflector 90 can be bell shaped.

Base end 104 of flow deflector 90 is disposed at lower plate 92. Base end 104 can form a flange configured to interface with lower plate 92 to clamp components of second member 78 together. Deflector side 106 extends between base end 104 and distal end 108. Deflector side 106 is a sloped surface extending between base end 104 and distal end 108. In the example shown, deflector side 106 is a concavely curved surface that extends annularly about flow deflector 90. Distal end 108 is a rounded tip in the example shown. It is understood, however, that other configurations of distal end 108 are possible. Distal end 108 is disposed within seat 82 during operation. Distal end 108 extends into the opening through seat 82 such that distal end 108 is disposed axially below top surface 116. In some states, distal end 108 can extend axially beyond transition surface 118. As such, at least a portion of flow deflector 90 can axially overlap with at least a portion of inner surface 120 along restrictor axis A-A with BPR 26 in the activated state. Flow deflector 90 can axially overlap a full extent of transition surface 118 with BPR 26 in the activated state. Flow deflector 90 can partially axially overlap with transition surface 118 and not axially overlap with inner surface 120 with BPR 26 in the activated state.

Annular restriction 102 is formed between second member 78 and seat 82. Annular restriction 102 forms the flowpath for spray liquid to exit flow chamber 46 and flow downstream from BPR 26. Annular restriction 102 extends between restriction inlet 128 and restriction outlet 130. Annular restriction 102 has upstream portion 132 and downstream portion 134. The height of the gap between seat 82 and second member 78 is the same within upstream portion 132. The gap between seat 82 and second member 78 remains constant along the width of upstream portion 132, between the upstream end of upstream portion 132 and the downstream end of upstream portion 132. Upstream portion 132 can also be referred to as a uniform portion. The gap between seat 82 and second member 78 varies within downstream portion 134 and widens between an upstream end of downstream portion 134 and a downstream end of downstream portion 134. Downstream portion 134 can also be referred to as a variable portion. In some examples, transition surface 118 has a first radius of curvature and deflector side 106 has a second radius of curvature different from the first radius of curvature. The second radius of curvature is larger than the first radius of curvature. In some examples, the radius of curvature of transition surface 118 can vary between the upstream end of transition surface 118 and the downstream end of transition surface 118. In some examples, the radius of curvatures of deflector side 106 can vary between base end 104 and distal end 108. In some examples, the radius of curvature of deflector side 106 can increase between base end 104 and distal end 108. The complementary curvatures of deflector side 106 and transition surface 118 facilitate turning of the liquid from radial flows entering annular restriction 102 to axial flows exiting annular restriction 102. An interface between the flat portion of second member 78 and the curved portion formed by deflector side 106 can be located radially closer to regulator axis A-A than an interface between flat top surface 116 and transition surface 118.

Spray liquid within flow chamber 46 exerts a force on second member 78 to bias second member 78 away from seat 82, opening the flowpath through annular restriction 102. Spray liquid enters annular restriction 102 at restriction inlet 128 and flows through upstream portion 132. Upstream portion 132 forms the narrowest part of the flowpath through annular restriction 102, interface between the flat top surface 116 and transition surface 118. Upstream portion 132 is the narrowest restriction in the flowpath through BPR 26. Varying the size of the restriction controls the pressure drop and flow rate across annular restriction 102, thereby controlling the actual liquid pressure in flow chamber 46 and upstream of BPR 26. The size of upstream portion 132 varies with the flow rate through BPR 26 such that the pressure drop across annular restriction 102 remains steady across the various flow rates. Upstream portion 132 can have the same width TW as top surface 116. Upstream portion 132 is sized to cause uniform, radial flow through upstream portion 132 to prevent undesired degradation. Upstream portion 132 is sized to provide quick reaction to variations in the flow rate such that the actual liquid pressure remains stable.

The spray liquid enters into downstream portion 134 of annular restriction 102 from upstream portion 132. Downstream portion 134 has a first cross-sectional area at the upstream end, where downstream portion 134 interfaces with upstream portion 132, and a second cross-sectional area at restriction outlet 130. The second cross-sectional area is larger than the first cross-sectional area. The cross-sectional area of downstream portion 134 smoothly expands between the first and second cross-sectional areas. The concave curvature of deflector side 106 and the convex curvature of transition surface 118 facilitate the smooth transition from the first cross-sectional area to the second cross-sectional area. The expansion of downstream portion 134 prevents a sudden velocity change that can occur due to a sudden enlargement of the cross-sectional area. Controlling the velocity change by the gradual opening of the cross-sectional area through annular restriction 102 encourages laminar flow and inhibits turbulent flow, preventing undesired collisions within the liquid that can cause degradation of the liquid.

The spray liquid encounters flow deflector 90 as the paint flows through annular restriction 102. Flow deflector 90 is disposed on regulator axis A-A such that the radial flows encounter flow deflector 90 before reaching regulator axis A-A. Flow deflector 90 turns the spray liquid from radial to axial flows as the spray liquid flows through annular restriction 102. Flow deflector 90 turns the radial flows entering annular restriction 102 to axial flows exiting annular restriction 102. The concave curvature of deflector side 106 turns the spray liquid as the spray liquid flows through annular restriction 102. Flow deflector 90 turns the radial liquid flows prior to the flows reaching regulator axis A-A. Flow deflector 90 thereby prevents the various radial flows from meeting and colliding. Instead, the flows are gradually turned such that substantially axial flows exit annular restriction 102 at restriction outlet 130 to combine downstream of annular restriction 102. Combining substantially axial flows facilitates laminar flow and avoids the turbulence and internal collisions that can occur when opposing radial flows converge.

Second member 78 and seat 82 provide significant advantages. Annular restriction 102 includes upstream portion 132, the cross-sectional area of which controls and maintains the pressure in flow chamber 46. The width of upstream portion 132 facilitates precision control of the pressure in flow chamber 46. Variations in the height of upstream portion 132 result in gradual changes in the actual liquid pressure in flow chamber 46. As such, second member 78 can fluctuate position relative to seat 82 without causing sudden pressure variations. Annular restriction 102 thereby provides greater and more responsive control to variations in flow rate. Annular restriction 102 maintains the actual liquid pressure at a steady pressure as the flow rate varies between high and low flow rates. Annular restriction 102 includes downstream portion 134 that gradually widens between upstream portion 132 and the exit of annular restriction 102.

The gradual widening of annular restriction 102 regulates the velocity change of the liquid flowing through annular restriction 102, preventing sudden deceleration that can cause turbulence and internal collisions. Flow deflector 90 prevents radial flows through annular restriction 102 from colliding and instead gradually turns the flows to generally axial flows exiting annular restriction 102. Preventing internal collisions prevents degradation and maintains desirable qualities of the spray liquid. For example, internal collisions can damage metallic flakes in paint, which damaged flakes can cause changes in the color of the paint.

Figure 5B:
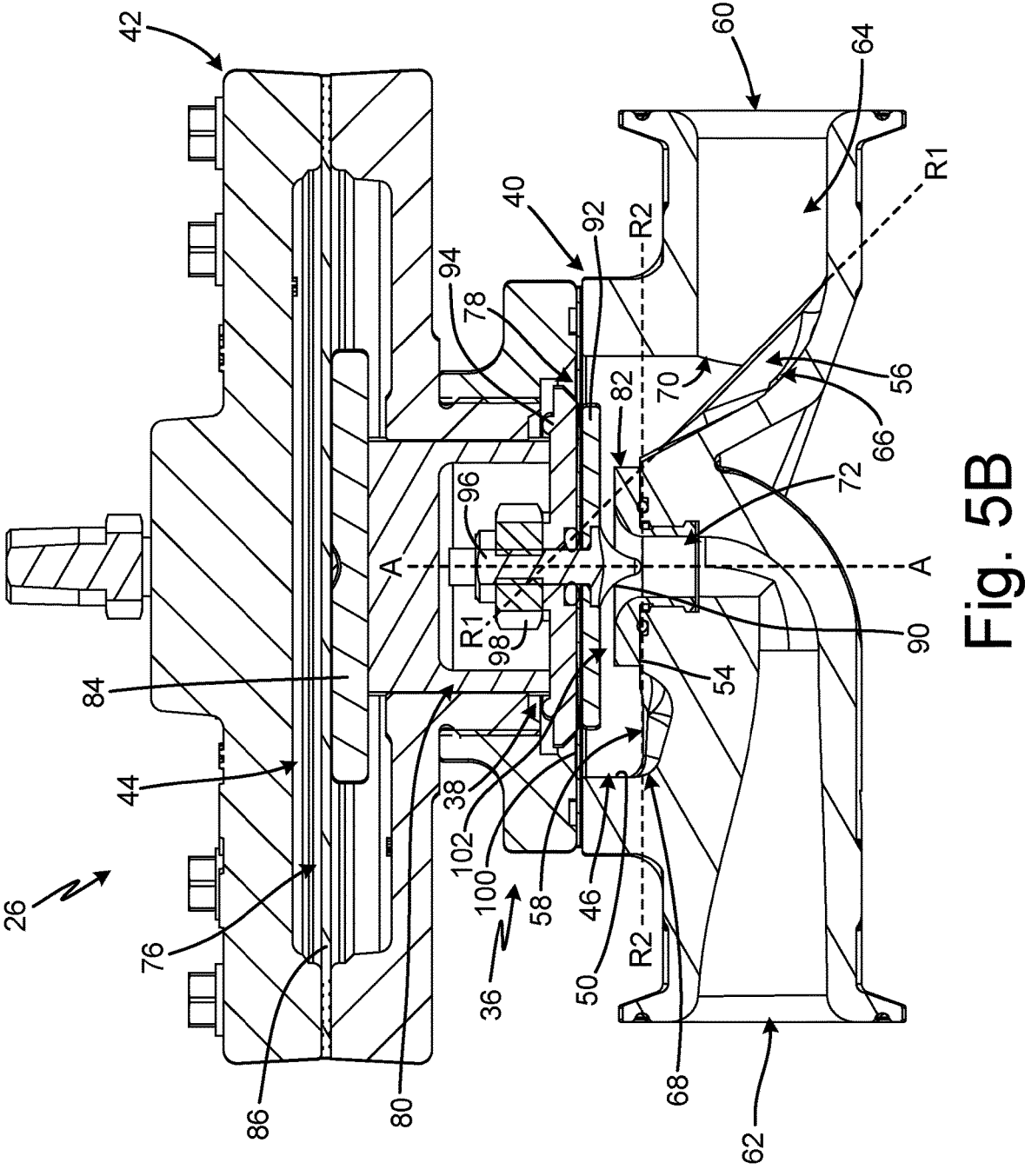
FIG. 5B is a cross-sectional view taken along line 5B-5B in FIG. 3B.

FIG. 5A is a cross-sectional view of BPR 26 taken along line 5A-5A in FIG. 3A. FIG. 5B is a cross-sectional view of BPR 26 taken along line 5B-5B in FIG. 3B. FIGS. 5A and 5B will be discussed together. BPR 26 includes body 36 and pressure control mechanism 38. Body 36 includes pressure housing 40 and control housing 42. BPR 26 further includes working fluid chamber 44 and flow chamber 46. Pressure housing 40 includes inner wall 48, outer wall 50, base walls 52a, 52b, regulator shelf 54, upstream ridge 56, downstream ridge 58, regulator inlet 60, regulator outlet 62, and side ridges 63a, 63b. Flow chamber 46 includes leading end 66, trailing end 68, chamber inlet 70, chamber outlet 72, and side passages 74a, 74b. Pressure control mechanism 38 includes first member 76, second member 78, regulator shaft 80, and seat 82. First plate 84 and first membrane 86 of first member 76 are shown. Second member 78 includes flow deflector 90, lower plate 92, upper plate 94, shaft 96, nut 98, and second membrane 100.

Pressure housing 40 is contoured to distribute an even flow of spray liquid circumferentially about seat 82. Pressure housing 40 provides a consistent radial flow velocity to and through annular restriction 102 (best seen in FIG. 4). Upstream ridge 56 is disposed at leading end 66 of flow chamber 46. Upstream ridge 56 is disposed on and extends from inner wall 48. Upstream ridge 56 can include sloped walls such that upstream ridge 56 has a first width at a base of upstream ridge 56 that is larger than a second width at the top of upstream ridge 56. Upstream ridge 56 has sloped sides that impart an outward flow component on the spray liquid to guide the spray liquid to side passages 74a, 74b. In some examples, the width of the base of upstream ridge 56 can vary along the length of upstream ridge 56. For example, the base of upstream ridge 56 can be narrower at a downstream end than at a portion of upstream ridge 56 upstream of that downstream end.

In the example shown, an upstream end of upstream ridge 56 is disposed in the flowpath between regulator inlet 60 and chamber inlet 70 and a downstream end of upstream ridge 56 is disposed within flow chamber 46 proximate an interface between inner wall 48 and regulator shelf 54. In some examples, the downstream end of upstream ridge 56 is spaced from the interface between inner wall 48 and regulator shelf 54 along inner wall 48. As such, the downstream end of upstream ridge 56 can terminate on inner wall 48 and be spaced from the interface between inner wall 48 and regulator shelf 54.

Side passages 74a, 74b extend arcuately about chamber outlet 72. Side passages 74a, 74b wrap around chamber outlet 72 between leading end 66 and trailing end 68. Side passage 74a is defined at least partially by inner wall 48, base wall 52a, and outer wall 50. Side passage 74b is defined at least partially by inner wall 48, base wall 52b, and outer wall 50. Inner wall 48 is a sloped wall narrowing between a base of flow chamber 46 and regulator shelf 54. Inner wall 48 is sloped to guide paint towards chamber outlet 72. Outer wall 50 extends circumferentially about flow chamber 46 and at least partially defines each side passage 74a, 74b. Outer wall 50 is a curved wall. Base walls 52a, 52b are curved about inner wall 48. Base walls 52a, 52b define the base end of each of side passages 74a, 74b, respectively. The volume of liquid within side passages 74a, 74b decreases between the upstream and downstream ends of the side passages 74a, 74b due to the liquid exiting through annular restriction 102. Base walls 52a, 52b are sloped between leading end 66 and trailing end 68 such that the height of each side passage 74a, 74b decreases between leading end 66 and trailing end 68. The decreasing height of each side passage 74a, 74b reduces the flow area of each side passage 74a, 74b from the upstream to downstream ends. The decreasing flow area maintains pressure and velocity as liquid exits from flow chamber 46 circumferentially about chamber outlet 72.

Downstream ridge 58 is disposed at trailing end 68 of flow chamber 46. Downstream ridge 58 is disposed between and separates the downstream ends of side passage 74a and side passage 74b. Downstream ridge 58 is a projection disposed between base walls 52a, 52b. Downstream ridge 58 extends between regulator shelf 54 and outer wall 50. Downstream ridge 58 extends between regulator shelf 54 and the portion of outer wall 50 disposed at trailing end 68 of flow chamber 46. Downstream ridge 58 includes sloped sides such that downstream ridge 58 has a first width at a base of downstream ridge 58 that is larger than a second width at the top of downstream ridge 58. The sloped sides turn the spray liquid at the downstream end of each side passage 74a, 74b. Downstream ridge 58 prevents the spray liquid exiting side passage 74a from colliding with the spray liquid exiting side passage 74b, which collision could cause damage to the paint and degradation of the paint. Downstream ridge 58 is contoured to turn the spray liquid flows to direct the spray liquid flows towards annular restriction 102. Downstream ridge 58 encourages substantially equal flow into annular restriction 102 from circumferentially about annular restriction 102.

Upstream ridge 56 can extend axially between the upstream and downstream ends of upstream ridge 56. Side ridges 63a, 63b are disposed on opposite lateral sides of upstream ridge 56. Side ridges 63a, 63b assist in directing flow to side passages 74a, 74b, respectively. Side ridges 63a, 63b can be formed on and extend from upstream ridge 56, in some examples. Side ridges 63a, 63b can have a shorter axial length than upstream ridge 56. Upstream ridge 56 can project further into the flowpath between regulator inlet 60 and chamber inlet 70 than side ridges 63a, 63b.

In the example shown, upstream ridge 56 is disposed on first ridge axis R1-R1. First ridge axis R1-R1 can intersect with regulator axis A-A. First ridge axis R1-R1 is transverse to regulator axis A-A. First ridge axis R1-R1 can be non-orthogonal to regulator axis A-A. First ridge axis R1-R1 can intersect with regulator axis A-A at a location outside of flow chamber 46. Downstream ridge 58 can extend axially between the inner and outer ends of downstream ridge 58. In the example shown, downstream ridge 58 is disposed on second ridge axis R2-R2. Second ridge axis R2-R2 can intersect with regulator axis A-A. Second ridge axis R2-R2 is transverse to regulator axis A-A. In some examples, second ridge axis R2-R2 can be orthogonal to regulator axis A-A. In some examples, second ridge axis R2-R2 can be non-orthogonal to regulator axis A-A. Second ridge axis R2-R2 can intersect with regulator axis A-A at a location outside of flow chamber 46. In the example shown, second ridge axis R2-R2 intersects with regulator axis A-A at a location within seat 82, which location can be within or below annular restriction 102. First ridge axis R1-R1 can be disposed transverse to second ridge axis R2-R2. First ridge axis R1-R1 can be non-orthogonal to second ridge axis R2-R2.

During operation, spray liquid enters pressure housing 40 through regulator inlet 60. The paint flows through inlet bore 64 and encounters upstream ridge 56. Upstream ridge 56 splits the paint into lateral flows that flow to side passages 74a, 74b. The flow of paint encounters upstream ridge 56 within inlet bore 64 at a location upstream of chamber inlet 70. Upstream ridge 56 imparts outward velocity components on the flows to guide the spray liquid to side passages 74a, 74b. A first subflow flows to and through side passage 74a and a second subflow flows to and through side passage 74b. The subflows flow through side passages 74a, 74b to trailing end 68 and downstream ridge 58. Downstream ridge 58 redirects the subflows to prevent collisions at trailing end 68 and guide the flows towards annular restriction 102. The spray liquid flows up inner wall 48 to annular restriction at leading end 66, along side passages 74a, 74b, and at trailing end 68. The contouring of pressure housing 40 provides a consistent, radial flow through annular restriction 102 from about the circumference of annular restriction 102.

BPR 26 provides significant advantages. Upstream ridge 56 imparts an outward velocity component on the spray liquid that guides the spray liquid into and along side passages 74a, 74b. Upstream ridge 56 is sloped to impart the outward velocity component. Such a sloped transition prevents collisions between the paint and pressure housing 40 that can cause degradation of the paint and cause accumulation of solids. The spray liquid flows through side passages 74a, 74b and wraps around annular restriction 102 and chamber outlet 72. Side passages 74a, 74b are ramped between leading end 66 and trailing end 68 such that the height between base walls 52a, 52b and second member 78 decreases between leading end 66 and trailing end 68 to maintain flow velocity and pressure throughout side passages 74a, 74b. Inner wall 48 is sloped towards annular restriction 102 to guide spray liquid towards annular restriction 102 from about the circumference of annular restriction 102. The ramped configurations of side passages 74a, 74b maintains flow velocity and pressure as the paint flows through side passages 74a, 74b. The contouring of pressure housing 40 directs the spray liquid towards annular restriction 102 with a consistent radial flow velocity about the circumference of annular restriction 102. Downstream ridge 58 redirects the paint at the downstream end of each side passage 74a, 74b to guide flow towards annular restriction 102, further providing the consistent radial velocity about annular restriction 102. Downstream ridge 58 also prevents collisions between the flows at the downstream ends of side passages 74a, 74b, preventing degradation.

The consistent radial flow velocity inhibits eddies and other turbulence in the spray liquid, avoiding internal collisions that can cause degradation. Preventing degradation provides greater user confidence and provides a longer useful life for the circulating liquid, reducing costs and downtime. The consistent flow further assists in maintaining the actual liquid pressure at the desired liquid pressure across a variety of flow rates. Maintaining the actual liquid pressure at the desired liquid pressure across a variety of flow rates provides improved spray consistency and spray quality. The contouring of pressure housing 40 provides smooth flow throughout flow chamber 46, preventing dead spaces that can lead to the accumulation of solids. The consistent flow also facilitates efficient flushing of flow chamber 46, reducing the time required to flush, simplifying the flushing process, and reducing the amount of material required to flush.

Figure 6A:
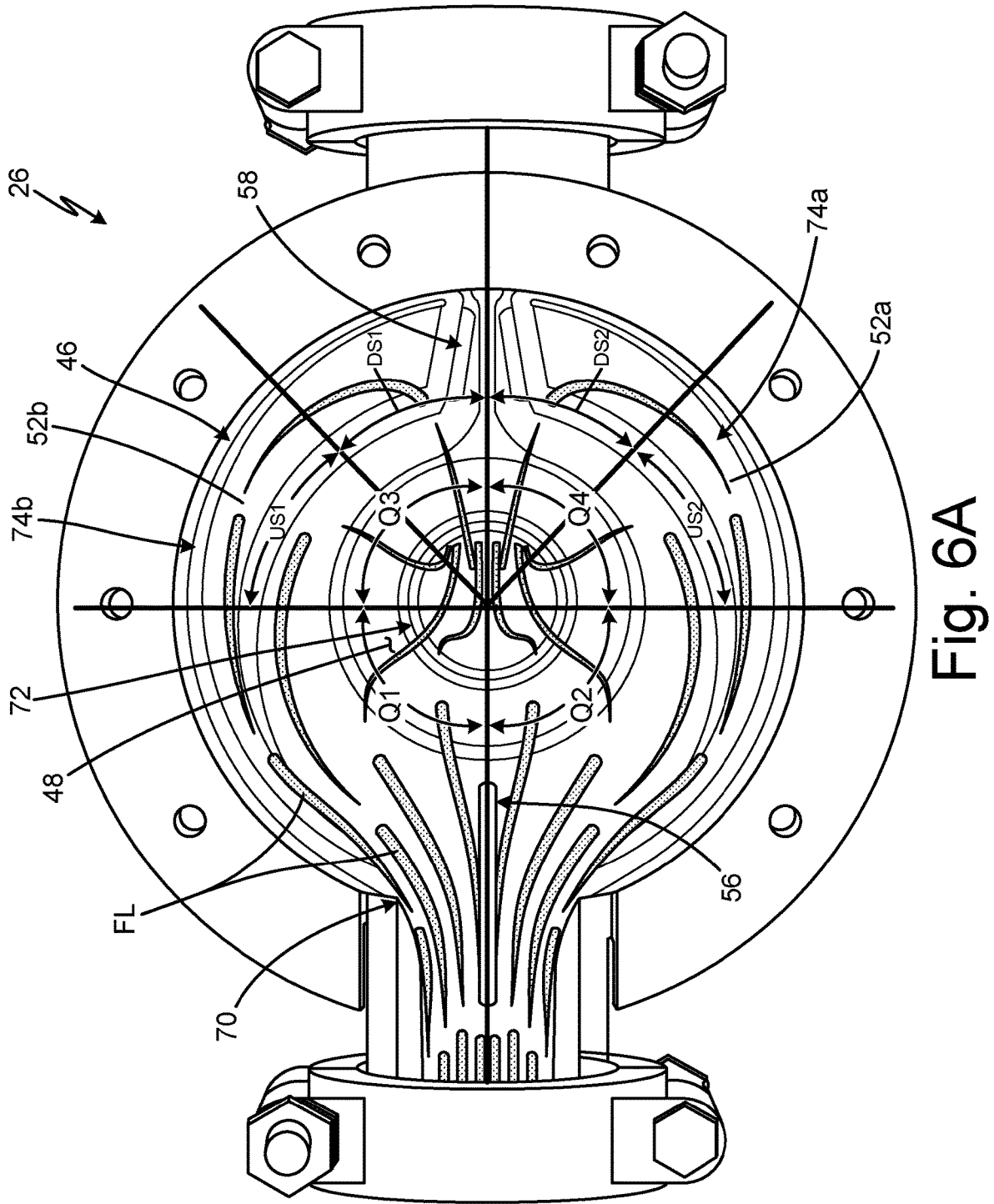
FIG. 6A is a cross-sectional view showing flow lines through a back pressure regulator.
Figure 6B:
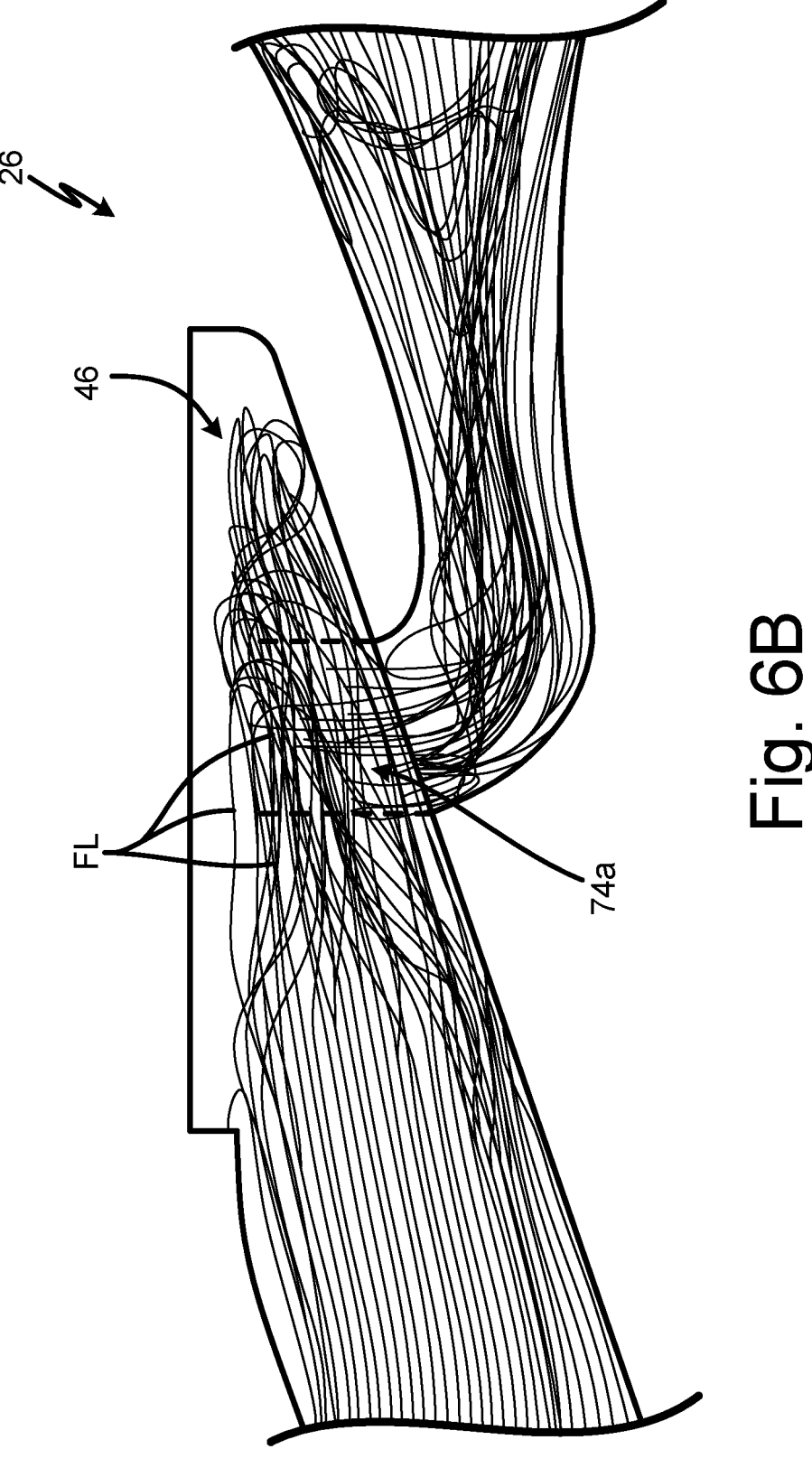
FIG. 6B is a side view of the back pressure regulator showing flow lines through the back pressure regulator.
Figure 6C:
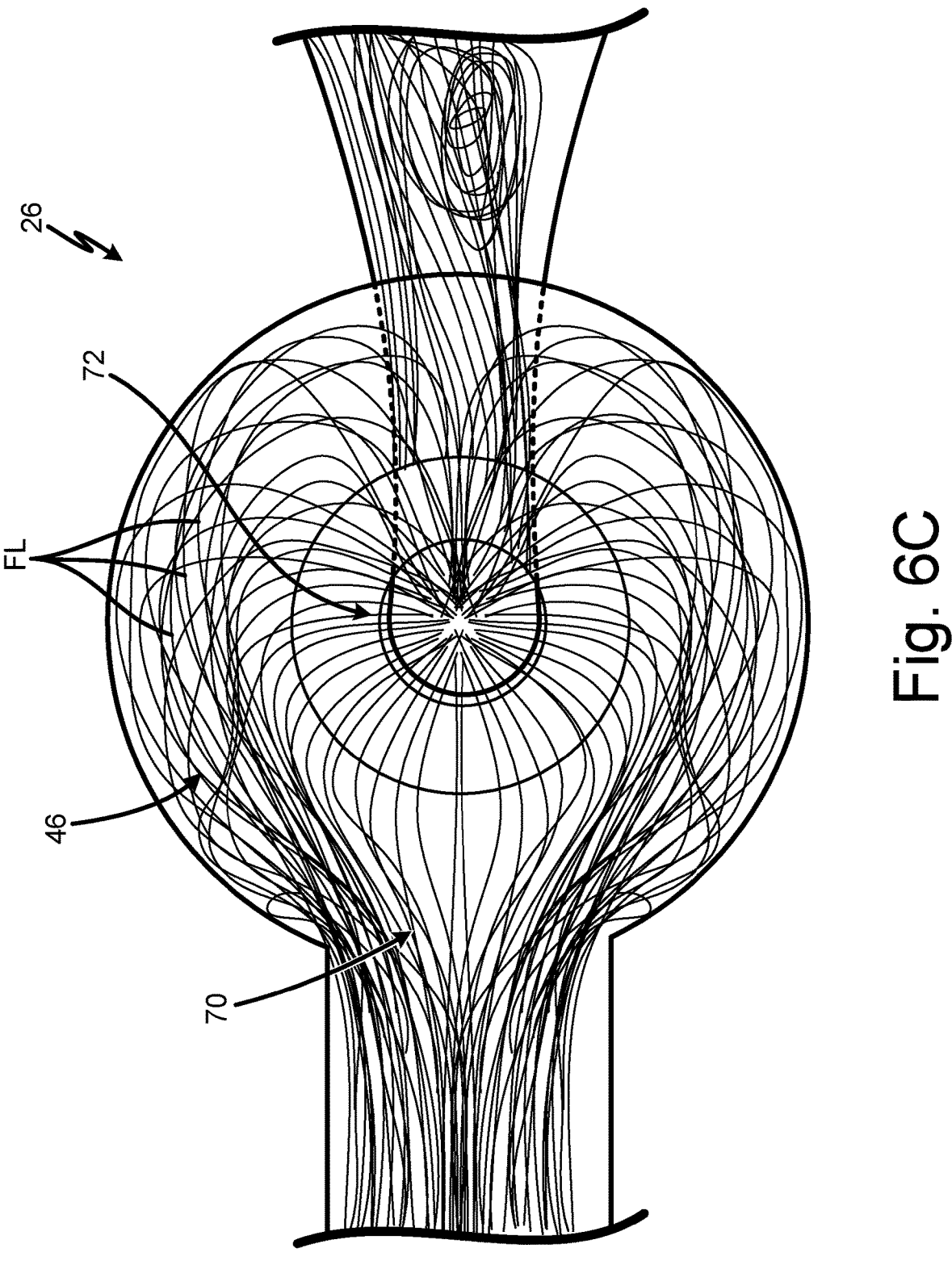
FIG. 6C is a top view of the back pressure regulator showing flow lines through the back pressure regulator.

FIG. 6A is a cross-sectional view of BPR 26 showing flow lines FL of the spray liquid through flow chamber 46. FIG. 6B is a side view of flow chamber 46 showing flow lines FL of the spray liquid through flow chamber 46. FIG. 6C is a top view of flow chamber 46 showing flow lines FL of the spray liquid through flow chamber 46. FIGS. 6A-6C will be discussed together. The spray liquid enters flow chamber 46 at chamber inlet 70. Upstream ridge 56 divides the spray liquid flow and imparts the outward velocity component on the spray liquid to cause the spray liquid to flow into side passages 74a, 74b. The spray liquid flows up inner wall 48 towards annular restriction 102 and chamber outlet 72. The spray liquid enters into annular restriction 102 (best seen in FIG. 4) and flows radially through annular restriction 102. Pressure housing 40 facilitates equal spray liquid flow into annular restriction 102 circumferentially about annular restriction 102. As the spray liquid flows downstream through side passages 74a, 74b the volume of the spray liquid within side passages 74a, 74b drops as paint exits side passages 74a, 74b and flow chamber 46 through annular restriction 102. The sloped side passages 74a, 74b maintain consistent flow and pressure by reducing the flow area between the upstream and downstream ends of side passages 74a, 74b, corresponding with the paint exiting flow chamber 46. Downstream ridge 58 redirects the flows at the downstream end of each side passage 74a, 74b towards annular restriction 102, further facilitating the consistent radial flow to annular restriction 102 about the circumference of annular restriction 102.

Flow chamber 48 can be considered to be divided into quadrants. First quadrant Q1 and second quadrant Q2 define an upstream half of flow chamber 48. Third quadrant Q3 and fourth quadrant Q4 define a downstream half of the flow chamber 48. As such, the first and second quadrants Q1, Q2 are disposed between chamber inlet 70 and a midpoint of chamber outlet 72 while the third and fourth quadrants Q3, Q4 are disposed between the horizontal line through axis A-A and trailing end 68 of flow chamber 48. Quadrant Q3 is divided into an upstream sector US1 and a downstream sector DS1. Quadrant Q4 is similarly divided into an upstream second US2 and a downstream second DS2.

During operation, BPR 26 facilitates consistent radial flow into annular restriction 102 from about the circumference of annular restriction 102. In some examples, more than about 35% of the flow exits flow chamber 46 and enters annular restriction 102 from the downstream half formed by the third and fourth quadrants Q3, Q4. In some examples, more than about 40% of the flow exits flow chamber 46 and enters annular restriction 102 through the downstream half formed by the third and fourth quadrants Q3, Q4. In some examples, more than about 45% of the flow exits flow chamber 46 and enters annular restriction 102 through the downstream half. In some examples, between about 35-50% of the flow exits flow chamber 46 and enters annular restriction 102 through the downstream half. In some examples, between about 40-50% of the flow exits flow chamber 46 and enters annular restriction 102 through the downstream half. In some examples, the ratio of spray liquid exiting flow chamber 46 from the upstream half versus the downstream half can be about 1:1. In some examples, the ratio of spray liquid exiting flow chamber 46 from the upstream half versus the downstream half can be about 11:9. In some examples, the ratio of spray liquid exiting flow chamber 46 from the upstream half versus the downstream half can be about 3:2. In some examples, the ratio of spray liquid exiting flow chamber 46 from the upstream half versus the downstream half can be more balanced than a ratio of about 7:3. In some examples, the ratio of spray liquid exiting flow chamber 46 from the upstream half versus the downstream half can be more balanced than a ratio of about 2:1.

The flow can exit flow chamber 46 in equal proportions through the two lateral sides of flow chamber 46. For example, the proportion of the flow exiting through the first and third quadrants Q1, Q3 can be equal to the proportion of the flow exiting through the second and fourth quadrants Q2, Q4.

In some examples, at least about 15% of the flow exits flow chamber 46 and enters annular restriction 102 from third quadrant Q3. In some examples, at least about 20% of the flow exits flow chamber 46 and enters annular restriction 102 from third quadrant Q3. In some examples, at least about 22.5% of the flow exits flow chamber 46 and enters annular restriction 102 from third quadrant Q3. In some examples, about 15-25% of the flow exits flow chamber 46 and enters annular restriction 102 from third quadrant Q3. In some examples, about 20-25% of the flow exits flow chamber 46 and enters annular restriction 102 from third quadrant Q3.

In some examples, more than about 10% of the flow exits flow chamber 46 and enters annular restriction 102 from upstream segment US1. In some examples, about 10-15% of the flow exits flow chamber 46 and enters annular restriction 102 from upstream segment US1. In some examples, about 12.5% of the flow exits flow chamber 46 and enters annular restriction 102 from upstream segment US1. In some examples, up to about 15% of the flow exits flow chamber 46 and enters annular restriction 102 from upstream segment US1.

In some examples, more than about 5% of the flow exits flow chamber 46 and enters annular restriction 102 from downstream segment DS1. In some examples, more than about 7.5% of the flow exits flow chamber 46 and enters annular restriction 102 from downstream segment DS1. In some examples, about 7.5-12.5% of the flow exits flow chamber 46 and enters annular restriction 102 from downstream segment DS1. In some examples, about 10% of the flow exits flow chamber 46 and enters annular restriction 102 from downstream segment DS1.

In some examples, at least about 15% of the flow exits flow chamber 46 and enters annular restriction 102 from fourth quadrant Q4. In some examples, at least about 20% of the flow exits flow chamber 46 and enters annular restriction 102 from fourth quadrant Q4. In some examples, at least about 22.5% of the flow exits flow chamber 46 and enters annular restriction 102 from fourth quadrant Q4. In some examples, about 15-25% of the flow exits flow chamber 46 and enters annular restriction 102 fourth quadrant Q4. In some examples, about 20-25% of the flow exits flow chamber 46 and enters annular restriction 102 from fourth quadrant Q4.

In some examples, more than about 10% of the flow exits flow chamber 46 and enters annular restriction 102 from upstream segment US2. In some examples, about 10-15% of the flow exits flow chamber 46 and enters annular restriction 102 from upstream segment US2. In some examples, about 12.5% of the flow exits flow chamber 46 and enters annular restriction 102 from upstream segment US2. In some examples, up to about 15% of the flow exits flow chamber 46 and enters annular restriction 102 from upstream segment US2.

In some examples, more than about 5% of the flow exits flow chamber 46 and enters annular restriction 102 from downstream segment DS2. In some examples, more than about 7.5% of the flow exits flow chamber 46 and enters annular restriction 102 from downstream segment DS2. In some examples, about 7.5-12.5% of the flow exits flow chamber 46 and enters annular restriction 102 from downstream segment DS2. In some examples, about 10% of the flow exits flow chamber 46 and enters annular restriction 102 from downstream segment DS2.

The consistent, balanced radial flow into annular restriction 102 inhibits eddies and other turbulence in the spray liquid, thereby avoiding internal collisions that can cause degradation. The contouring of flow chamber 46 prevents the formation of dead spots that can lead to the accumulation of solids. The contouring of pressure housing 40 thereby facilitates flushing of flow chamber 46 and consistent flow through flow chamber 46. The consistent flow circumferentially into annular restriction 102 also facilitates consistent velocity of the spray liquid, preventing undesired velocity changes that can cause turbulence and degradation. The spray liquid entering annular restriction 102 circumferentially about annular restriction 102 facilitates quick reaction to variations in the flow though BPR 26. BPR 26 is thus more responsive to variations in the volumetric flow through BPR 26 and provides a consistent actual liquid pressure within flow chamber 46. The quick reaction to flow variations prevents undesired pressure spikes and variations. BPR 26 thereby maintains a steady actual liquid pressure throughout operation as the flow rate through BPR 26 varies, which maintains a consistent velocity through annular restriction 102 and prevents undesired turbulence and internal collisions that can cause degradation. Maintaining a consistent actual liquid pressure provides uniform spray quality and pattern at the sprayer upstream of BPR 26. The uniform spray pattern and spray pressure provide consistency between applications, providing high-quality, uniform finishes that are desirable both to the user and consumer.

Figure 7:
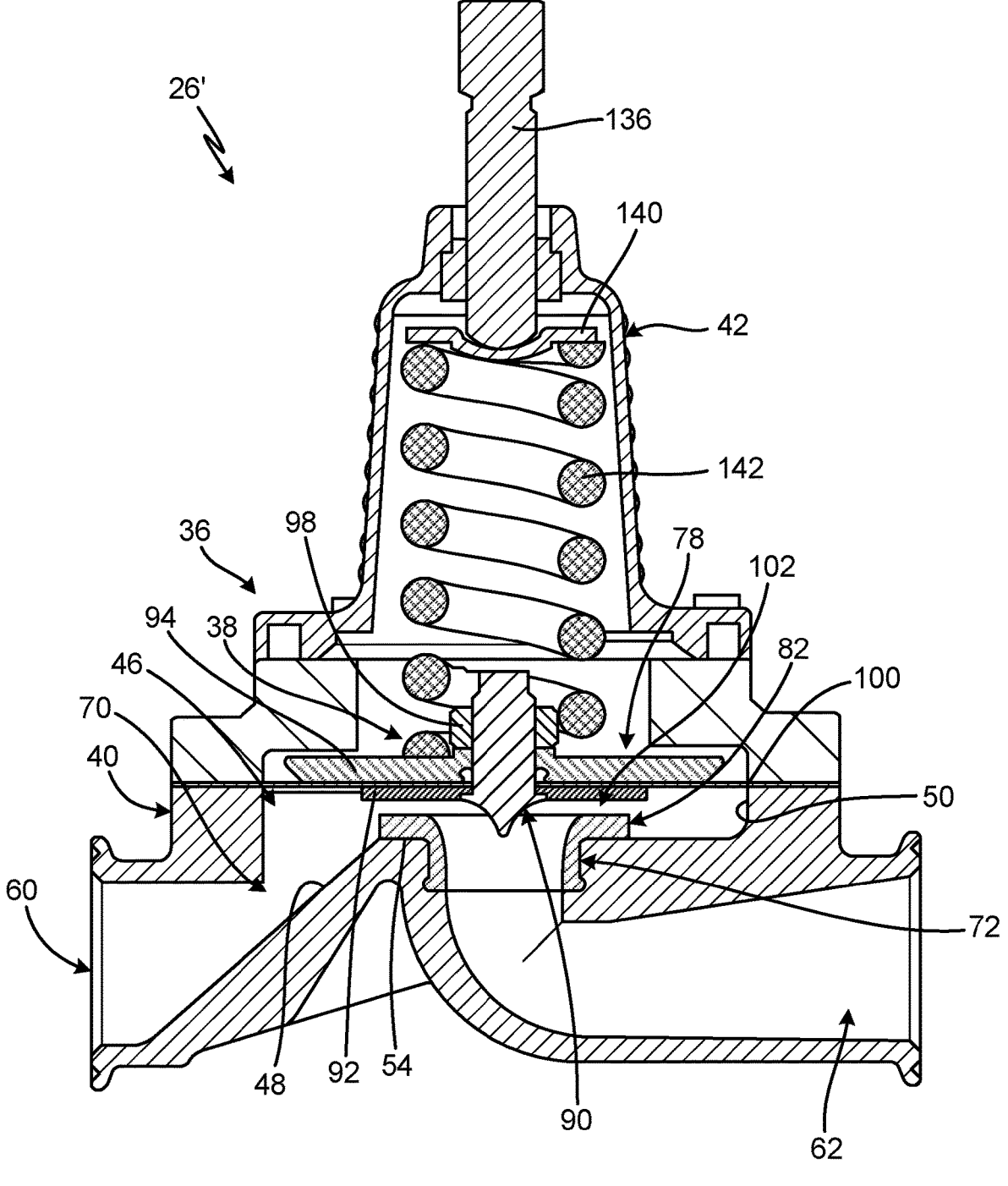
FIG. 7 is a cross-sectional view of a back pressure regulator.

FIG. 7 is a cross-sectional view of BPR 26'. BPR 26' is substantially similar to BPR 26 (FIGS. 1, 3A-6C), except BPR 26' mechanically biases the pressure control mechanism 38 towards the closed state while BPR 26 fluidically biases the pressure control mechanism 38' towards the closed state.

Pressure control mechanism 38' is substantially similar to pressure control mechanism 38, except pressure control mechanism 38' includes control pin 136, control plate 138, and control spring 140. Control pin 136 is movable relative to control housing 42 to adjust the position of control plate 140 within control housing 42. Changing the position of control plate 140 changes the compression of control spring 142 to control the back pressure upstream of BPR 26'. For example, control pin 136 can be mounted to control housing 42 by interfaced threading and can be rotated between various pressure control positions.

Control spring 142 extends to and interfaces with upper plate 94. Shaft 96 and nut 98 can extend into and control spring 142 to locate control spring 142 on second member 78. Control spring 142 can be sized such that a diameter of control spring 142 overlaps with top surface 116. Sizing control spring 142 to have such an overlap facilitates balanced variations in the gap forming upstream portion 132. The uniform variation maintains steady flow through annular restriction 102 from circumferentially about annular restriction 102, preventing the formation of turbulent flows and providing steady back pressure across a variety of flow rates.

Figure 8:
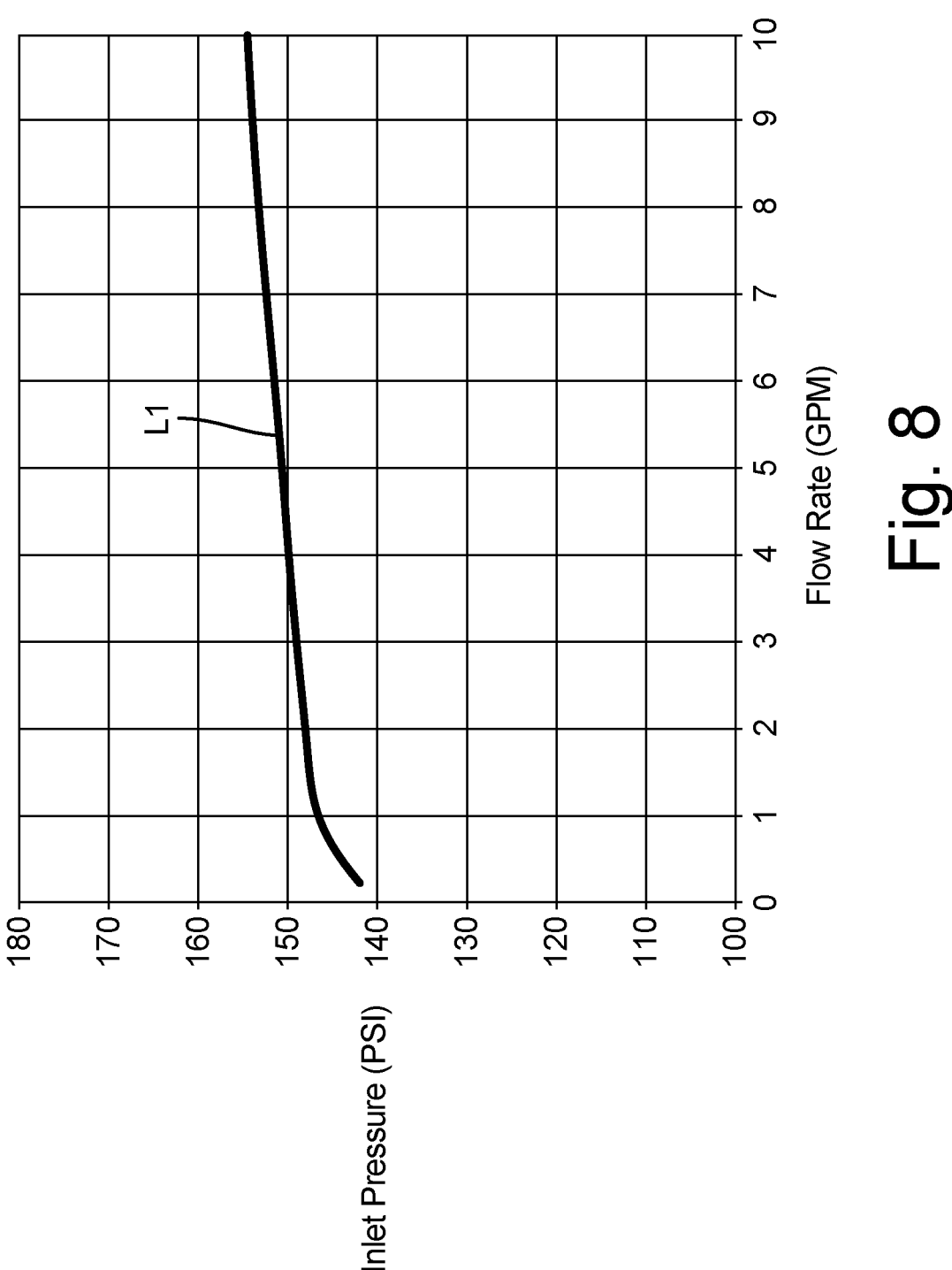
FIG. 8 is a graph showing inlet pressure and flow rate for a back pressure regulator.

FIG. 8 is a graph illustrating inlet pressure versus flow rate for a back pressure regulator such as BPR 26 and BPR 26'. The vertical axis is inlet pressure in pounds per square inch (psi). The horizontal axis is flow rate in gallons per minute (gpm). Line L1 shows a pressure curve of the actual liquid pressure in flow chamber 46 for BPR 26. In the example shown, the desired liquid pressure is set at 150 psi (about 1.03 megapascal (MPa)).

The actual liquid pressure was measured across a variety of flow rates through BPR 26. As discussed above, the opening through annular restriction 102 varies with the changing flow rate to maintain a steady actual liquid pressure in flow chamber 46 relative the desired liquid pressure. BPR 26, 26' maintains the actual liquid pressure within ten percent of the desired liquid pressure. In some examples, BPR 26, 26' maintains the liquid pressure within about five percent of the desired liquid pressure. The inlet pressure at about 0.2 gpm (about 0.76 liters per minutes (lpm)) is about 142.3 psi (about 0.98 MPa). The inlet pressure at about 10 gpm (about 37.85 lpm) is about 154.2 psi (about 1.06 MPa). As shown, the actual liquid pressure increases as the flow rate increases. The rate of change of the actual liquid pressure can vary with the flow rate. The rate of change of the actual liquid pressure decreases as the flow rate increases. In some examples, the actual liquid pressure varies less than about 1.5 psi for every 1 gpm change in the flow rate. In some examples, the actual liquid pressure varies less than about 1 psi for every 1 gpm change in the flow rate for at least a portion of the flow variation. In the example shown, the actual liquid pressure changes about 0.85 psi for every 1 gpm change between flow rates of 1 gpm and 10 gpm. The actual liquid pressure changes about 0.74 psi for every 1 gpm change between flow rates of 5 gpm and 10 gpm. The actual liquid pressure changes about 0.68 psi for every 1 gpm change between flow rates of 7.5 gpm and 10 gpm. While the example shown is for a desired liquid pressure of about 150 psi (about 1.03 MPa), it is understood that BPR 26, 26' can provide similar advantages across a variety of desired liquid pressures. BPR 26, 26' maintaining the actual liquid pressure proximate the desired liquid pressure across a variety of flow rates ensure that a sprayer upstream of BPR 26, 26' generates a uniform spray pattern, providing consistent application and finish quality.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A back pressure regulator comprising:
a pressure housing having an outer wall, an inner wall;
a flow chamber at least partially defined by the pressure housing, the flow chamber comprising a chamber inlet through the pressure housing and a chamber outlet through the pressure housing, wherein the flow chamber extends circumferentially about the chamber outlet;
an upstream ridge projecting from the inner wall and into the flow chamber, the upstream ridge elongate along a ridge axis that extends in a flow direction between the chamber inlet and the chamber outlet; and a pressure control member at least partially defining the flow chamber, wherein the pressure control member includes a flow deflector disposed on a regulator axis and configured to extend at least partially into the chamber outlet;
wherein the inner wall is sloped between a lower end and an upper end; and
wherein the pressure control member is movable between a closed state during which the chamber outlet is closed, and an activated state during which an annular restriction between the flow chamber and the chamber outlet is open.

2. The back pressure regulator of claim 1, further comprising:
a first side passage extending between the chamber inlet and a trailing end of the flow chamber; and
a second side passage extending between the chamber inlet and the trailing end;
wherein the first side passage and the second side passage are curved about the chamber outlet.

3. The back pressure regulator of claim 2, wherein the first side passage has a ramped base such that a height of the first side passage decreases between the chamber inlet and the trailing end.

4. The back pressure regulator of claim 3, wherein the inner wall is sloped between the ramped base and a shelf, and wherein the chamber outlet extends through the shelf.

5. The back pressure regulator of claim 2, further comprising:
an upstream ridge projecting from the inner wall and configured to divide flow into the first side passage and the second side passage; and
a downstream ridge disposed at the trailing end between a first downstream end of the first side passage and a second downstream end of the second side passage.

6. The back pressure regulator of claim 1, wherein the ridge axis is disposed transverse to the regulator axis.

7. The back pressure regulator of claim 1, further comprising:
a downstream flow ridge disposed at the trailing end of the flow chamber;
wherein the upstream flow ridge projects from the inner wall.

8. The back pressure regulator of claim 1, wherein the upstream flow ridge has sloped sides and the downstream flow ridge has sloped sides.

9. The back pressure regulator of claim 1, wherein the upstream flow ridge extends through the chamber inlet into a flowpath between a regulator inlet and the chamber inlet.

10. The back pressure regulator of claim 1, wherein the upstream flow ridge is contoured to guide flow into a first side passage and a second side passage, wherein the first side passage and the second side passage are curved about the inner wall.

11. The back pressure regulator of claim 7, wherein the downstream flow ridge is contoured to guide flow from a first side passage and a second side passage to the chamber outlet, wherein the first side passage and the second side passage are curved about the inner wall.

12. The back pressure regulator of claim 1, further comprising:
a seat mounted to the pressure housing, wherein the chamber outlet extends through the seat;
wherein the pressure control member and the seat define the annular restriction therebetween; and
wherein the annular restriction provides a flowpath between the flow chamber and the chamber outlet.

13. The back pressure regulator of claim 12, wherein the seat comprises:

a top portion disposed on a regulator shelf formed at a top end of the inner wall;

a lower portion that extends into the pressure housing;

a top surface formed on the top portion and oriented towards the pressure control member;

an inner surface formed on an inner radial side of the lower portion; and a transition surface extending between and connecting the top surface and the inner surface, wherein the transition surface is curved.

14. The back pressure regulator of claim 13, wherein the deflector includes a contoured side extending between a base and a distal end, and wherein the contoured side is concavely curved.

15. The back pressure regulator of claim 14, wherein the annular restriction includes an upstream portion extending from a restriction inlet and a downstream portion extending between the upstream portion and a restriction outlet.

16. The back pressure regulator of claim 15, wherein the upstream portion has a uniform cross-sectional area and the downstream portion has a variable cross-sectional area.

17. The back pressure regulator of claim 15, wherein the downstream portion widens between the upstream portion and the regulator outlet.

18. The back pressure regulator of claim 1, further comprising:

a control housing at least partially defining a working fluid chamber;

wherein the pressure control member comprises:

a first member bounding the working fluid chamber;

a second member bounding the flow chamber; and a regulator shaft extending between the first member and the second member;

wherein a first pressure in the working fluid chamber biases the pressure control member in a first axial direction and towards a closed state and a second pressure in the flow chamber biases the pressure control member in a second axial direction opposite the first axial direction and towards an open state.

19. A method of regulating an upstream pressure with a back pressure regulator having a pressure housing, a flow chamber at least partially within the pressure housing, the flow chamber having a chamber inlet and a chamber outlet through the pressure housing, and the flow chamber extending circumferentially around the chamber outlet, the method comprising:

dividing an inlet flow of a liquid into a first subflow and a second subflow by an upstream ridge that projects from the pressure housing and into the flow chamber, the upstream ridge elongate along a ridge axis that extends in a flow direction between the chamber inlet and the chamber outlet;

flowing the first subflow through a first side passage that is ramped between an upstream end and a downstream end and that is curved about a chamber outlet;

flowing the second subflow through a second side passage that is ramped between the upstream end and the downstream end and that is curved about the chamber outlet;

redirecting the first subflow and the second subflow at the downstream end and towards the chamber outlet;

flowing the liquid through an annular restriction to the chamber outlet; and varying a size of the annular restriction based on a volumetric flow rate of the liquid.

* * * * *